(12) United States Patent     (10) Patent No.:   US 12,630,108 B1

Jost        (45) Date of Patent:     May 19, 2026

---

(54) OCCUPANT PROTECTION SYSTEM WITH DEPLOYABLE CURTAINS AND AIRBAGS

(71) Applicant: Zoox, Inc., Foster City, CA (US)

(72) Inventor: Markus Jost, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 19/265,787

(22) Filed: Jul. 10, 2025

(51) Int. Cl.
    B60R 21/232      (2011.01)
    B60R 21/237      (2006.01)
    B60R 21/231      (2011.01)

(52) U.S. Cl.
    CPC .......... B60R 21/232 (2013.01); B60R 21/237 (2013.01); *B60R 2021/23107* (2013.01); *B60R 2021/23192* (2013.01)

(58) Field of Classification Search
    CPC ................ B60R 21/232; B60R 21/237; B60R 2021/23107; B60R 2021/23192
    See application file for complete search history.

(56) References Cited

U.S. PATENT DOCUMENTS

| | | | | |
|---|---|---|---|---|
| 9,725,064 | B1 * | 8/2017 | Faruque | ................. B60N 2/143 |
| 10,023,146 | B2 * | 7/2018 | Faruque | ................. B60N 2/143 |
| 10,315,609 | B2 * | 6/2019 | Thomas | ................ B60R 21/261 |

| | | | | |
|---|---|---|---|---|
| 10,589,708 | B2 * | 3/2020 | Cho | .................... B60R 21/0136 |
| 10,906,496 | B2 * | 2/2021 | Baccouche | ........... B60R 21/213 |
| 10,953,835 | B2 * | 3/2021 | Gould | ................... B60R 21/232 |
| 11,117,543 | B2 * | 9/2021 | Jimenez | ............... B60R 21/214 |
| 11,267,431 | B2 * | 3/2022 | Sekizuka | ................ B60R 21/26 |
| 11,351,949 | B2 * | 6/2022 | Fischer | ................. B60R 21/216 |
| 11,840,190 | B1 * | 12/2023 | Swiniarski | ........... B60R 21/232 |
| 11,938,888 | B2 * | 3/2024 | Fischer | .................. G02B 13/06 |
| 11,951,929 | B2 | 4/2024 | Jost et al. | |
| 2018/0215338 | A1 * | 8/2018 | Faruque | ............... B60R 21/264 |
| 2019/0161048 | A1 * | 5/2019 | Thomas | ............... B60R 21/264 |
| 2019/0193666 | A1 * | 6/2019 | Jost | ................... B60R 21/23138 |
| 2019/0299908 | A1 * | 10/2019 | Farooq | ................. B60R 21/233 |
| 2020/0307496 | A1 * | 10/2020 | Jimenez | ............... B60R 21/214 |
| 2020/0361410 | A1 * | 11/2020 | Jayakar | ................ B60R 21/214 |

\* cited by examiner

*Primary Examiner* — Toan C To

(74) *Attorney, Agent, or Firm* — Lee & Hayes, P.C.

(57)          ABSTRACT

A vehicle includes a first expandable curtain, a second expandable curtain, a third expandable curtain, a first airbag, and a second airbag disposed in the roof of the vehicle. The first expandable curtain, the second expandable curtain, the third expandable curtain, the first airbag, and the second airbag are selectively deployable from a stowed configuration to a deployed configuration. The third expandable curtain couples to the first expandable curtain and the second expandable curtain.

20 Claims, 17 Drawing Sheets

1400

RECEIVE DATA ASSOCIATED WITH A VEHICLE AND/OR OCCUPANT(S) WITHIN THE VEHICLE 1402

ADJUST A POSITION OF ONE OR MORE AIRBAGS WITHIN THE VEHICLE 1404

RECEIVE SENSOR DATA FROM ONE OR MORE SENSORS ASSOCIATED WITH THE VEHICLE 1406

TRIGGERING EVENT? 1408

NO

YES

DETERMINE A DIRECTION OF TRAVEL 1410

CAUSE ONE OR MORE EXPANDABLE CURTAINS AND/OR THE ONE OR MORE AIRBAGS TO DEPLOY 1412

OCCUPANT PROTECTION SYSTEM WITH DEPLOYABLE CURTAINS AND AIRBAGS

BACKGROUND

Vehicles are equipped with airbag(s) that protect occupant(s) of the vehicle in the event of a collision. For example, in response to the collision, the airbag(s) may rapidly inflate to create a cushion between the occupant, surfaces of the vehicle, and/or object(s) inside the vehicle. Conventional airbags attempt to reduce the effects of these instances by reducing the difference between the speed of the occupant and the speed of any surface the occupant contacts. However, conventional airbags may not provide sufficient protection to the occupant(s) during certain collision conditions and/or vehicle configurations. In addition, conventional airbags may not fit within the form factors of newer style vehicles.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted.

DETAILED DESCRIPTION

Figure 1:
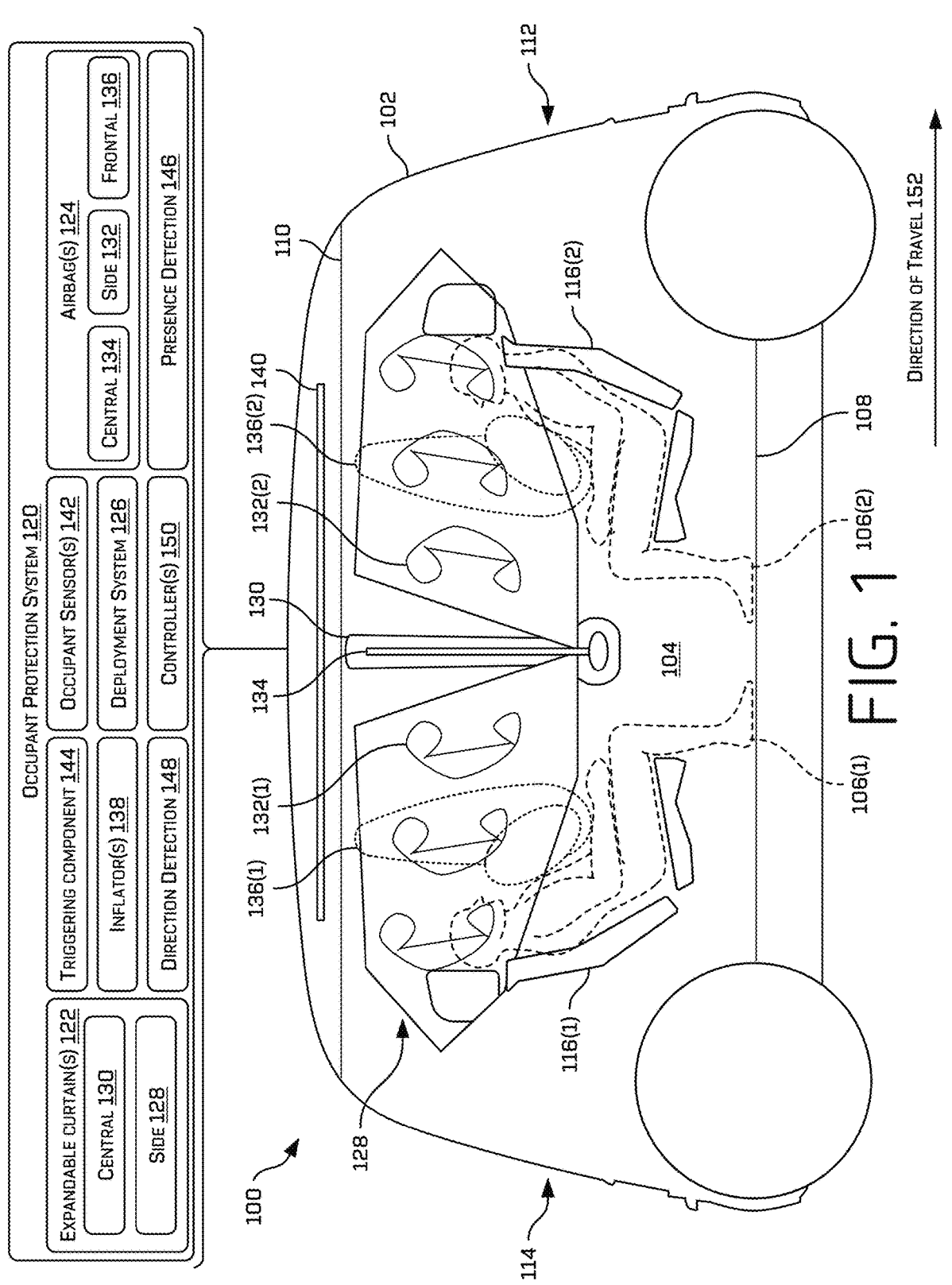
FIG. 1 illustrates a side view of an example vehicle including an example occupant protection system, according to an example of the present disclosure.

This application relates to occupant protection technology (e.g., software, methods, processes, systems, etc.) that includes expandable curtains and airbags that deploy to protect one or more occupants of a vehicle during a collision, according to an embodiment of the present disclosure. The occupant protection system is configured to expand from a stowed state to a deployed state, during and/or in anticipation of the collision, and may have a height that extends all or part of a distance between a vehicle roof and a vehicle floor, a width that extends all or part of a distance between interior sides of the vehicle, and a length that extends all or part of a distance between interior ends of the vehicle. In some instances, the expandable curtains may include side expandable curtains that deploy along the interior sides of the vehicle, between the interior ends, a central expandable curtain that deploys within or between the interior sides, and frontal airbags that deploy in front of the occupants. The side expandable curtains may be integrated with, and/or coupled to, the central expandable curtain to impart or control the movement of the central expandable curtain during the collision. The frontal airbags may restrain the movement of the occupant's head to limit forces or moments experienced by the occupants.

In some instances, the occupant protection system may be used in vehicles with carriage-style seating arrangements in which two or more seats face one another. For example, a cabin (e.g., passenger compartment) of the vehicle may include a first seat (e.g., first bench) disposed at a first interior end of the cabin and a second seat (e.g., second bench) disposed at a second interior end of the cabin. The first seat and the second seat face or are oriented towards one another. The seats themselves may accommodate one or more occupants, such as two occupants. The central expandable curtain, when deployed, is disposed between the two seats. The frontal airbags, when deployed, are disposed between the side expandable curtains, as well as between the central expandable curtain and one of the first interior end or the second interior end. However, the occupant protection system described herein may additionally or alternatively be configured for use in a vehicle with any number of seats facing in a same direction (e.g., a forward-facing direction).

The side expandable curtains may include a first side expandable curtain that deploys along a first interior side (e.g., left side) of the vehicle and a second side expandable curtain that deploys along a second interior side (e.g., right side) of the vehicle. In some instances, the first side expandable curtain may be configured to extend substantially parallel to the first interior side of the vehicle and/or the second side expandable curtain may be configured to extend substantially parallel to the second interior side of the vehicle. The first side expandable curtain and the second side expandable curtain may also extend between the first interior end and the second interior end.

In some instances, the side expandable curtains may include a first section and a second section, where the first section and/or the second section may include one or more airbags that inflate during deployment. Inflation of the airbags within the first section and/or the second section may cause the side expandable curtain to deploy from the vehicle roof. The first section may include a first airbag and the second section may include a second airbag having any suitable shape, size, etc. The first airbag and the second airbag may be fluidly disconnected from one another, however, the first section and the second section of the side expandable curtains may be adjoined or formed from the same piece of material. That is, although described as separate sections, the first section and the second section may be formed from a single piece of material. In this sense, the first side section and the second side section may represent different portions, areas, or sections of the side expandable curtain. However, in some instances, the first section and the second section may be formed from different pieces of material that are coupled together.

The airbags of the side expandable curtain are formed within, or from, a material of the side expandable curtain. The airbags represent a portion of the side expandable curtain that inflate in the event of the collision. For example, portions of a material of the side expandable curtain may be interconnected by stitching or ultrasonic welding to form connections or seams that define the airbags. In some instances, when inflated, the airbags of the side expandable curtain may prevent ejection of the occupant from within the cabin and/or contact between the occupant (e.g., the head of the occupant) and the interior sides of the vehicle. Portions of the side expandable curtain not corresponding to the airbags may be tethered, anchored, etc., to the vehicle roof or other portions of the vehicle (e.g., interior sides).

The central expandable curtain may be disposed between the interior sides of the vehicle, such as the first interior side and the second interior side. The central expandable curtain extends transversely between the first side expandable curtain and the second side expandable curtain. In some instances, the central expandable curtain includes an airbag that inflates in the event of the collision. When deployed, the central expandable curtain is deployed between the first seat and the second seat. The central expandable curtain may prevent or limit projectiles (e.g., objects, debris, etc.) from moving from one end of the vehicle to another end of the vehicle during the collision (e.g., between the first interior end and the second interior end).

The airbag of the central expandable curtain is formed within, or from, a material of the central expandable curtain. For example, portions of a material of the central expandable curtain may be interconnected by stitching or ultrasonic welding to form connections or seams that define the airbag. The airbag represents a portion of the central expandable curtain that inflates in the event of a collision. However, although described as including an airbag that inflates, in some instances, the central expandable curtain may not include an airbag. In such instances, the central expandable curtain may resemble a sheet, divider, barrier, etc., that is not inflated, but which may prevent or limit projectiles moving from one end of the vehicle to another.

The side expandable curtains may be coupled to the central expandable curtain. Coupling the side expandable curtains to the central expandable curtain may help deploy the central expandable curtain and/or control the deployment of the central expandable curtain. For example, when deployed, the central expandable curtain may help pull the central expandable curtain from the vehicle roof (e.g., in a direction towards the vehicle floor) to be deployed between the interior ends of the vehicle.

The central expandable curtain may couple to the central expandable curtain at or along a first side and may couple to the second side expandable curtain at or along a second side, spaced apart from the first side of the central expandable curtain. A bottom of the central expandable curtain may couple to a bottom of the first side expandable curtain and/or a bottom of the second side expandable curtain. A top of the central expandable curtain may not be coupled to a top of the first side expandable curtain and/or a top of the second side expandable curtain. In some instances, the top of the central expandable curtain may be spaced apart from the top of the first side expandable curtain and/or the top of the second side expandable curtain to reduce the weight and/or volume within the vehicle roof The side expandable curtains may couple to the central expandable curtain directly, or indirectly (e.g., via straps, tethers, strips of material, etc.).

In some instances, the side expandable curtains and the central expandable curtain may be formed from separate pieces of material. Alternatively, the side expandable curtains and the central expandable curtain may be formed from the same piece of material. For example, although described as separate curtains, the side expandable curtains (e.g., the first side expandable curtain and the second side expandable curtain) and the central expandable curtain may be contiguous and formed from a single piece of material.

The side expandable curtains may be stored (i.e., prior to deployment) within the roof vehicle. In some instances, the side expandable curtains may be stored by rolling the side expandable curtains. In other words, the side expandable curtain may be roll-folded into the vehicle roof Rolling of the side expandable curtain may control a deployment of the side expandable curtain along the interior sides of the vehicle, as compared to being spaced apart (e.g., towards the center of the vehicle) from the interior sides. The central expandable curtain may span between the side expandable curtains to assist in deploying the side expandable curtains along the interior sides of the vehicle.

The central expandable curtain may be stored (i.e., prior to deployment) within the vehicle roof In some instances, the central expandable curtain may be stored by folding the central expandable curtain in a zigzag or U-shaped fashion (i.e., over itself). The zigzag folding nature of the central expandable curtain helps with a symmetrical deployment of the central expandable curtain in the event of a collision. That is, the central expandable curtain may be deployed centrally between the interior ends of the vehicle, rather than being biased towards one interior end of the vehicle. However, although described as being folded in the zigzag fashion, the central expandable curtain may be roll-folded or accordion folded. To permit the symmetrical deployment of the central expandable curtain when roll-folded, the central expandable curtain may be tethered or coupled to the side expandable curtains. Moreover, other folds for the side expandable curtains and the central expandable curtain are envisioned.

The frontal airbags may deploy in front of the occupants, respectively, during the collision. For example, if the vehicle includes two bench-style seats capable of receiving two occupants each, the vehicle may include four of the frontal airbags (here, the term "frontal" does not necessarily denote a location within the vehicle or a direction the vehicle is traveling but merely to describe the airbag to engage directly with one of the passengers located therein). Before being deployed, the frontal airbags may be located overhead of the occupants, within the vehicle roof. Locating the frontal airbags in this manner may reduce a weight and/or volume within a central portion of the roof (e.g., between the interior sides and the interior ends of the vehicle).

In some instances, the frontal airbags may include a first channel and a second channel that are fluidly connected to a central chamber. The central chamber may inflate to provide restraint to the head of the occupant in the event of a collision. The first channel and the second channel may route fluid or gas to the central chamber to inflate the central chamber. The first channel and the second channel may route alongside sides of the head of the occupant, such as the first channel routing alongside a left side of the head and the second channel routing alongside a right side of the head. The first channel and the second channel may represent ducts, tubes, etc., formed in the frontal airbag. In some instances, the first channel and the second channel, being as they route the fluid to the central chamber, may be filled or inflated prior to the central chamber being inflated.

As the central chamber is inflated, the central chamber may inflate in a direction towards the occupant to restrain movement of the head upon contact. The frontal airbag may also include vents, ports, apertures, etc., to vent the central chamber to cushion and decelerate the head of the occupant. A material of the frontal airbags may also provide cushion and deceleration. The frontal airbags may be tethered, anchored, etc., to the vehicle roof or other portions of the vehicle.

The airbags of the side expandable curtains, the airbags of the central expandable curtain, and/or the frontal airbags may represent expandable bladders configured to expand from a stowed state to a deployed state, or between a deflated state and an inflated state. The occupant protection system may include a deployment control system configured to cause the side expandable curtains, the central expandable curtain, and the frontal airbags to expand from the stowed state to the deployed state. For example, the deployment control system may be configured to activate one or more inflators in flow communication with the airbags of the side expandable curtains, the airbag of the central expandable curtain, and the frontal airbags. During inflation, the side expandable curtains, the central expandable curtain, and the frontal airbags may rapidly expand from the vehicle roof As such, upon involvement in a collision, the occupant protection system may rapidly inflate to create a cushion between the occupant and interior surfaces of the vehicle.

In some instances, a first inflator is in flow communication with the first airbag of the first side expandable curtain (e.g., on the first section), a second inflator is in flow communication with the second airbag of the first side expandable curtain (e.g., on the second section), a third inflator is in flow communication with the first airbag of the second side expandable curtain (e.g., on the first section), a fourth inflator is in flow communication with the second airbag of the second side expandable curtain (e.g., on the second section), a fifth inflator is in flow communication with the airbag of the central expandable curtain, and sixth inflators are in communication with the frontal airbags. Each of the frontal airbags may be inflated via individual inflators. Thus, in the case where the vehicle has four seats across two bench-style seats, the vehicle may include a total of nine inflators.

Although described as including a certain number of inflators, the vehicle may include more than or less than nine of the inflators. For example, the airbags of the side expandable curtains may be inflated via a common inflator. Moreover, in instances where the central expandable curtain omits the airbag, an inflator may be omitted. The inflators provide a fluid or gas to the airbags. In some instances, the inflators may include a gas generator, pyrotechnic charge, propellants, and/or any other suitable devices or systems.

In some instances, the deployment control system may be configured to cause the side expandable curtains to deploy and/or expand from the stowed state to the deployed state at a first time, and thereafter, cause the central expandable curtain to expand from the stowed state to the deployed state at a second time following the first time. The frontal airbags may be deployed at least partially during the first time or the second time. However, other sequences of deploying the side expandable curtains, the central expandable curtain, and the frontal airbags are envisioned.

In some examples, the deployment control system may be configured to receive a signal indicative of a predicted collision involving the vehicle and/or a collision involving the vehicle, and cause deployment of the occupant protection system. For example, sensors associated with the vehicle may predict an imminent collision involving the vehicle or may detect a collision upon occurrence, and the deployment control system may receive one or more signals associated with the prediction and/or detection and activate the occupant protection system.

In some instances, the side expandable curtains, the central expandable curtain, and the frontal airbags may be coupled to the vehicle to secure the side expandable curtains, the central expandable curtain, and the frontal airbags during the collision. For example, a top of the side expandable curtains, a top of the central expandable curtain, and a top of the frontal airbags may be coupled to a frame of the occupant protection system within the vehicle roof or ceiling of the vehicle. The coupling may tether the expandable curtain to the vehicle such that, once deployed, the side expandable curtains, the central expandable curtain, and the frontal airbags are prevented from swinging in a direction away from the occupant during the collision.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting examples. The features illustrated or described in connection with one example may be combined with the features of other examples. Such modifications and variations are intended to be included within the scope of the appended claims.

FIG. 1 is a side cutaway view of a vehicle 100, according to an embodiment of the present disclosure. For the purpose of illustration, the vehicle 100 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle 100 at any time. In such examples, because the vehicle 100 may be configured to control all functions from start to completion of the trip, including all parking functions, it may not include a driver and/or controls for driving the vehicle 100, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially- or fully-autonomously controlled.

As shown in FIG. 1, the vehicle 100 includes a body 102 defining an interior 104 of the vehicle 100. The interior 104 generally defines a cabin, passenger, cargo, or other compartment in which occupants 106 reside. As also illustrated, the interior 104 extends generally in a vertical direction from a vehicle floor 108 to a vehicle roof 110. The interior 104 also extends in a longitudinal direction, such as between a first end 112 of the vehicle 100 and a second end 114 of the vehicle 100. The interior 104 may also have a lateral dimension (e.g., normal to the viewing plane of FIG. 1) between opposite sides of the vehicle 100. In FIG. 1, the sides of the vehicle 100 have been removed for clarity. As will be appreciated, the body 102 and other aspects of the vehicle 100 are examples.

The vehicle 100 may be configured for bi-directional travel, such that when the vehicle 100 is travelling in a direction of travel 152 (from left to right in FIG. 1) the first end 112 of the vehicle 100 is the leading end of the vehicle 100 and the second end 114 is the trailing end of the vehicle 100. Conversely, when the vehicle 100 is travelling in a direction opposite the direction of travel 152 (from right to left in FIG. 1) the second end 114 is the leading end of the vehicle 100 and the first end 112 becomes the trailing end of the vehicle 100.

A first seat 116(1) and a second seat 116(2) (collectively, "the seats 116" or individually, "the seat 116") are disposed in the interior 104. In the example of FIG. 1, a first occupant 106(1) is seated in the first seat 116(1) and a second occupant 106(2) is seated in the second seat 116(2). Collectively, the first occupant 106(1) and the second occupant 106(2) may be referred to herein as "the occupants 106," and one of the first occupant 106(1) or the second occupant 106(2) (or other occupant(s) not shown in FIG. 1) may be referred to generically as "the occupant 106."

The seats 116 include a seat portion on which the occupant 106 sits. The seat portion may be configured to support at least a portion of a weight of the occupant 106. The seat portion may include various contours, cushions, and/or other functional and/or aesthetic features. The seats 116 also include a seatback portion. A portion of a back of the occupant 106 may rest against or otherwise contact the seatback portion when the occupant 106 is seated. The seats 116 also include a headrest, for supporting at least a back of a head of the occupant 106. The seats 116 may also include a seat belt to prevent the occupants 106 from being ejected.

The seats 116 are arranged carriage-style such that the first occupant 106(1) and the second occupant 106(2) are facing each other. Accordingly, regardless of the direction of travel, one of the occupants 106 may face the direction of travel 152 and the other may have their back to the direction of travel 152. Although the example in FIG. 1 includes only the first seat 116(1) and the second seat 116(2), the first seat 116(1) may be one of a plurality of aligned first seats in a first row of seats, and/or the second seat 116(2) may be one of a plurality of aligned second seats in a second row of seats. Moreover, although the first seat 116(1) and the second seat 116(2) are illustrated as supporting a single one of the occupants 106, in other examples, the seats 116 may be disposed as benches on which more than one of the occupants 106 may sit. For example, the seats 116 may include bench style seats that support two of the occupants 106. Other relative arrangements and numbers of the seats 116 are contemplated.

With reference to FIG. 1, when the vehicle 100 travels in the direction of travel 152, the first occupant 106(1) is forward-facing and the second occupant 106(2) is rearward-facing. When travelling in the direction of travel 152, should the vehicle 100 come to an abrupt stop, such as because of a rapid deceleration resulting from a collision or impact at the first end 112 of the vehicle 100, the occupants 106 experience different forces associated with the deceleration differently. More specifically, a head of the second occupant 106(2) may be forced against the headrest portion of the second seat 116(2), and the back of the second occupant 106(2) may be forced against the seatback portion the second seat 116(2). In contrast, the inertia of the first occupant 106(1) causes the first occupant 106(1) to continue to move in the direction of travel 152, which may tend to move the first occupant 106(1) relative to (and out of) the first seat 116(1).

The vehicle 100 may include an occupant protection system 120 configured to protect the occupants 106 during a collision involving the vehicle 100. As will be explained herein, the occupant protection system 120 may include one or more expandable curtain(s) 122, one or more airbag(s) 124, and a deployment system 126 configured to control deployment of one or more of the expandable curtain(s) 122 and/or the one or more airbag(s) 124. For example, the deployment system 126 may deploy the expandable curtain(s) 122 and/or the one or more airbag(s) 124 from a stowed stated to a deployed state. The expandable curtain(s) 122 and/or the airbag(s) 124 may be formed from, for example, a woven nylon fabric and/or other similar materials, or materials having suitable characteristics, and which may be storable within the vehicle roof 110. The expandable curtain(s) 122 and the airbag(s) 124, before being deployed, may be concealed within the vehicle roof 110 via one or more covers, panels, etc., and which are breached during deployment. As such, the vehicle roof 110 may be configured to receive the expandable curtain(s) 122 and/or the airbag(s) 124.

The expandable curtain(s) 122 may include side expandable curtains 128 and a central expandable curtain 130. One of the side expandable curtains 128 is shown deployed in FIG. 1, for example, along a left side of the interior 104. Another of the side expandable curtains 128 is deployed along a right side of the interior 104. The side expandable curtains 128 extend between the first end 112 and the second end 114, along the first side and the second side, respectively, within the interior 104. The central expandable curtain 130 is disposed between the first side and the second side, centrally between the first end 112 and the second end 114. The central expandable curtain 130 may extend transversely to or from the side expandable curtains 128. When deployed, the side expandable curtains 128 and the central expandable curtain extend from the vehicle roof 110.

The side expandable curtains 128 and the central expandable curtain 130 also include the airbag(s) 124 that inflate. For example, the side expandable curtains 128 may include first side airbag(s) 132(1) and second side airbag(s) 132(2). The central expandable curtain 130 may include a central airbag 134. The airbag(s) 124 may be integrated, whether directly or indirectly, with the side expandable curtains 128 and the central expandable curtain 130, respectively. Additional details of the side expandable curtains 128 and the central expandable curtain 130 are discussed herein.

The occupant protection system 120 further includes frontal airbags 136 to cushion and/or decelerate a head of the occupant 106 in the event of a collision. The frontal airbags 136 are shown in dashed lines to indicate their position behind the side expandable curtain 128 (e.g., into the page). Two of the frontal airbags 136, such as a first frontal airbag 136(1) and a second frontal airbag 136(2) are shown deployed in FIG. 1, in front of the first occupant 106(1) and the second occupant 106(2), respectively. However, the frontal airbags 136 may be in front of each of the occupants 106. Thus, when the vehicle 100 has four of the occupants 106, for example, two on each of the seats 116, four of the frontal airbags 136 may be deployed. In some examples, passenger detection mechanisms may be employed (e.g., using cameras available internally, seatbelt interlock detection, infrared sensing on seatbelts, etc.) so that, in turn, only those individual airbags associated with passengers are deployed.

In some instances, upon receipt of one or more signals from the vehicle 100, the deployment system 126 may be configured to activate one or more inflators 138 in flow communication with the airbag(s) 124, such that the inflators 138 provide a fluid or gas to the airbag(s) 124, respectively, to deploy the expandable curtain(s) 122. When inflated, the expandable curtain(s) 122 and/or the airbag(s) 124 may rapidly expand from their stowed state to their respective deployed states. The inflators 138 may include a gas generator, pyrotechnic charge, propellants, and/or any other suitable devices or systems.

As explained herein, the expandable curtain(s) 122 and/or the airbag(s) 124, in the deployed state, may protect the occupant 106 from injury, or reduce its likelihood or severity, during a collision involving the vehicle 100 by providing a cushion between the occupant 106 and the interior 104 of the vehicle 100. The side expandable curtains 128 may prevent ejection of the occupant 106 or contents of the cabin from within the interior 104 and/or contact between the occupant 106 (e.g., the head of the occupant 106) and the interior 104. The central expandable curtain 130 may prevent or limit projectiles (e.g., objects (e.g., groceries, cellular telephones, laptops, books, etc.), debris, or other contents of the cabin) from moving from one end of the vehicle 100 to another end of the vehicle 100 during the collision (e.g., between the first end 112 and the second end 114, and vice versa).

In some instances, the expandable curtain(s) 122 and/or the airbag(s) 124 may extend from a framework 140 disposed in the vehicle roof 110. For example, when deployed, the expandable curtain(s) 122 may drape, suspend, or otherwise hang from the framework 140. The framework 140 may also house or couple the inflators 138 to the expandable curtain(s) 122 and/or the airbag(s) 124. For example, the framework 140 may include conduits that channel propellants from the inflators 138 to the expandable curtain(s) 122 and/or the airbag(s) 124. In some instances, the framework 140 may be disposed external to a footprint or area of a sunroof of the vehicle 100.

In some instances, the vehicle 100 may be configured such that (all of) the expandable curtain(s) 122 and/or the airbag(s) 124 deploy or inflate in response to a collision. In other instances, the deployment system 126 may selectively inflate (fewer than all of) the expandable curtain(s) 122 and/or the airbag(s) 124 based on additional information about the vehicle 100. For example, the vehicle 100 may include occupant sensors 142 that are configured to generate data associated with a presence/absence of the occupant 106 in the seat 116, respectively. Responsive to the occupant 106 being in the seat 116, the deployment system 126 may cause the expandable curtain(s) 122 and/or the airbag(s) 124 to be deployed.

In some instances, the occupant sensors 142 may be coupled to, or integrated into, the seatback portion of the seats 116. However, in other examples, the occupant sensors 142 may be coupled to, or incorporated into, the seat portion and/or any other portion of the seats 116. Without limitation, the occupant sensors 142 may include pressure sensors, weight sensors, or other types of sensors that generate data for determining that some amount of mass is in the seat 116. In still further examples, the occupant sensors 142 may be embodied as other types of sensors, such as cameras, imaging sensors, or the like, that generate data used to determine the presence of the occupant(s) 106.

The occupant protection system 120 is further shown including a triggering component 144, a presence detection component 146, a direction detection component 148, and controller(s) 150. The triggering component 144, the presence detection component 146, the direction detection component 148, and/or the controller(s) 150 may be embodied as one or more computing components configured to perform functionality associated with the occupant protection system 120. Although illustrated separately, some or all aspects of the occupant protection system 120 may be combined.

The triggering component 144 may include functionality to determine that the vehicle 100 is involved in a collision, when the vehicle 100 experiences a sudden deceleration, when the vehicle 100 anticipates a collision in the immediate or near future, or other situation in which inflating the airbags would provide additional safety (or otherwise) to the occupants or items within the cabin. Alternatively, or additionally, the triggering component 144 may include functionality to determine that a collision is imminent or impending. Without limitation, the triggering component 144 may receive data about an acceleration (or deceleration) of the vehicle 100, objects in the environment of the vehicle 100, from a prediction system configured to determine a likelihood of a collision with an object, and/or other types of data from other sources.

The presence detection component 146 may include functionality to determine the presence of objects in the vehicle 100. For example, the presence detection component 146 may receive data from the occupant sensors 142 and, based at least in part on that data, determine the seats 116 that are occupied by the occupants 106, respectively. In some instances, the presence detection component 146 may make a determination of whether a given seat has an occupant (e.g., a likelihood, a binary determination, or otherwise).

The direction detection component 148 includes functionality to determine a direction of travel of the vehicle 100. For example, the direction detection component 148 may determine that the vehicle 100 is travelling in the direction of travel 152. The direction detection component 148 may determine the direction of travel 152 based at least in part on any one of sensor data, heading data, route planning data, map data, and/or other data. The direction detection component 148 may additionally, or alternatively, determine a direction associated with each of the seats 116 and/or of the occupants 106 of the seats 116. For instance, in the example of FIG. 1, the direction detection component 148 may determine that the first seat 116(1) is a forward-facing seat and that the second seat 116(2) is a rearward-facing seat.

The controller(s) 150 include functionality to inflate one or more of the expandable curtain(s) 122 and/or the airbag(s) 124. In examples, the controller(s) 150 receive data from one or more of the triggering component 144, the presence detection component 146, and/or the direction detection component 148. For example, the controller(s) 150 may cause inflation of one or more of the expandable curtain(s) 122 and/or the airbag(s) 124 based at least in part on information from the triggering component 144 indicating that a collision event has occurred or is imminent. In another example, the controller(s) 150 may cause inflation of the expandable curtain(s) 122 and/or the airbag(s) 124 based at least in part on information from the presence detection component 146. For instance, the controller(s) 150 may deploy the airbag(s) 124 associated with the seats 116 that have the occupants 106. If none of the occupant(s) 106 is/are associated with a seat 116, the controller(s) 150 may not deploy the airbag(s) 124 associated with that seat 116, even when a collision occurs. Still, in a further example, the controller(s) 150 may cause inflation of the expandable curtain(s) 122 and/or the airbag(s) 124 based at least in part on information from the direction detection component 148 indicating the direction of travel 152 and/or an orientation of the seats 116. For example, the controller(s) 150 may deploy the expandable curtain(s) 122 and/or the airbag(s) 124 associated with any occupied rear-facing seat. Of course, these are examples only, intended to demonstrate various functionality of the controller(s) 150.

Figure 2:
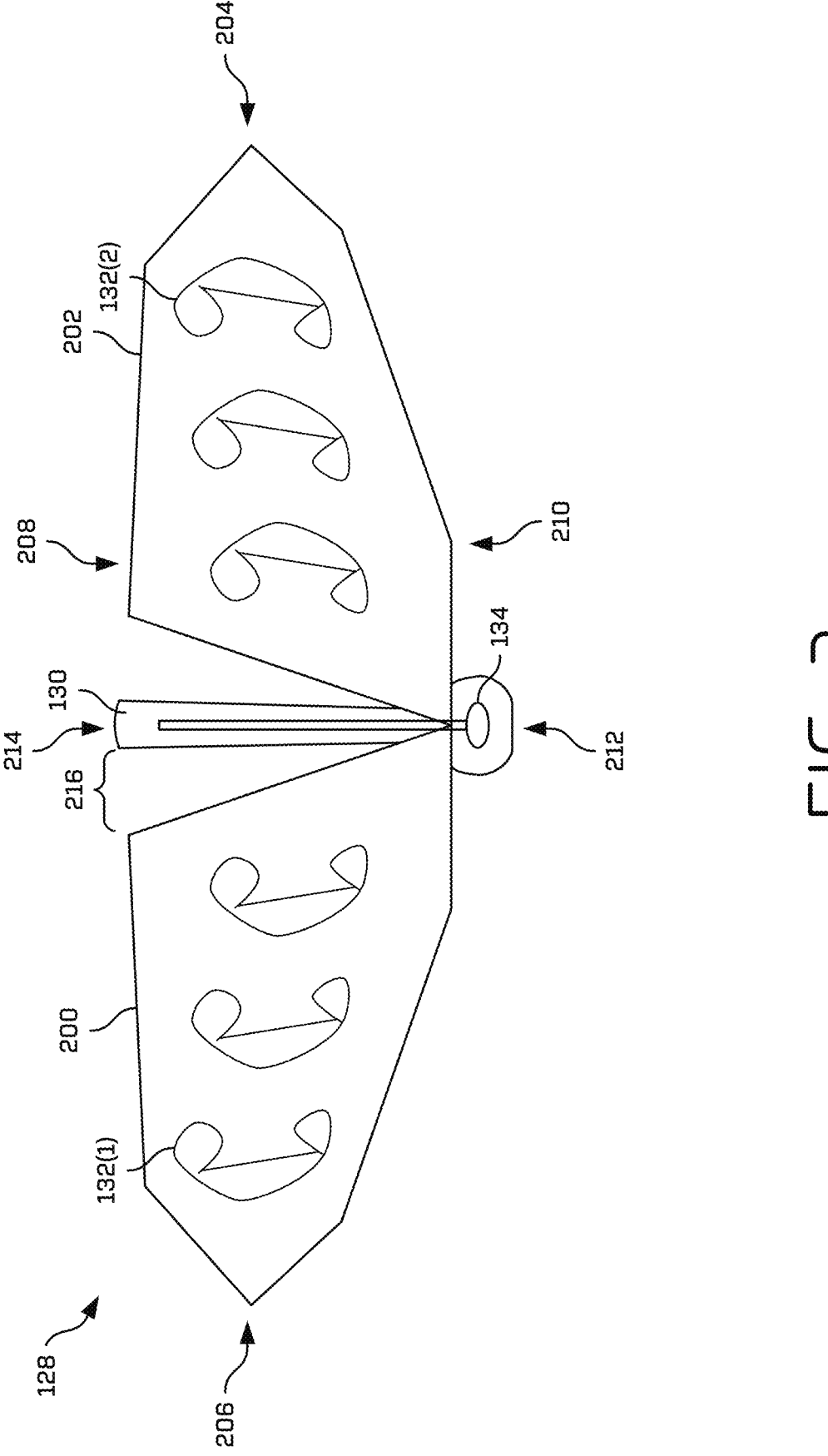
FIG. 2 illustrates a side view of an example side expandable curtain and an example central expandable curtain of the occupant protection system of FIG. 1, showing the side expandable curtain and the central expandable curtain in a deployed state, according to an example of the present disclosure.

FIG. 2 illustrates a side view of the side expandable curtain 128 and the central expandable curtain 130, according to an embodiment of the present disclosure. The side expandable curtain 128 may include a first section 200 and a second section 202. The first section 200, when deployed, may be disposed alongside or adjacent to the first seat 116(1), and the second section 202, when deployed, may be disposed alongside or adjacent to the second seat 116(2). Although described as separate sections, the first section 200 and the second section 202 may be formed from a single piece of material. Of course, in other examples, the first section 200 and second section 202 may be different pieces of material joined at a mating position (e.g., through stitching, adhesives, or the like). The first section 200 and the second section 202 may represent different portions, areas, or sections of the side expandable curtain 128.

In some examples, the first section 200 and the second section 202 may include one or more of the side airbags 132 that inflate. The side airbags 132 represent a portion of the side expandable curtain 128 that inflates in the event of the collision or other triggering event (e.g., sudden deceleration). Inflation of the side airbags 132 within the first section 200 and the second section 202 may cause the side expandable curtain 128 to deploy from the vehicle roof 110. The first section 200 may include the first side airbag(s) 132(1) and the second section 202 may include the second side airbag(s) 132(2). The first side airbag(s) 132(1) and the second side airbag(s) 132(2) may be fluidly disconnected from one another. The first side airbag(s) 132(1) and the second side airbag(s) 132(2) may be inflated by separate inflators. The side airbags 132 of the side expandable curtain 128 are formed within, or from, a material of the side expandable curtain 128.

In some instances, the first side airbag(s) 132(1) and the second side airbag(s) 132(2) may be fluidly connected to one another, for example, via a duct, tubing, etc., that spans between the first section 200 and the second section 202. In such instances, the first side airbag(s) 132(1) and the second side airbag(s) 132(2) may be inflated via common inflators.

Although a certain size, shape, configuration, etc., of the first side airbag(s) 132(1) and the second side airbag(s) 132(2) is shown, other sizes, shapes, configurations, etc., are envisioned. For example, the first section 200 or the second section 202 may include more than three airbags and/or the first side airbag(s) 132(1) and the second side airbag(s) 132(2) may be different shaped than shown. The first section 200 and the second section 202 may also be shaped differently than shown.

The side expandable curtain 128 may be disposed between the ends of the interior 104. For example, the side expandable curtain 128 may include a first end 204 disposed adjacent to the first end 112 of the vehicle 100 and a second end 206 disposed adjacent to the second end 114 of the vehicle 100. The side expandable curtain 128 also includes a top 208 disposed adjacent to the vehicle roof 110, and a bottom 210 spaced apart from the vehicle roof 110 when deployed. The first end 204, the second end 206, and/or the top 208 may be anchored or tethered to the vehicle roof 110, or other structures of the vehicle roof 110, to control deployment and/or movement of the side expandable curtain 128, such as the framework 140.

The central expandable curtain 130 extends between the side expandable curtains 128. In some instances, the central expandable curtain 130 includes the central airbag 134 that inflates in the event of a collision. In some instances, the central airbag 134 of the central expandable curtain 130 may represent a portion of the central expandable curtain 130 that inflates in the event of a collision. In some instances, the central expandable curtain 130 may omit or not include the central airbag 134, but instead, the central expandable curtain 130 may represent a sheet of material that deploys in the event of a collision.

The central expandable curtain 130 may couple to the side expandable curtains 128. For example, the central expandable curtain 130 may couple to the bottom 210 of the side expandable curtains 128 (e.g., via stitching, adhesives, being formed of a single material, or otherwise). The central expandable curtain 130 may couple to the bottom 210 of the first side expandable curtain at or along a first side of the central expandable curtain 130 and may couple to the second side expandable curtain at or along a second side of the central expandable curtain 130. The central expandable curtain 130 may couple to the side expandable curtains 128 proximate to a bottom 212 of the central expandable curtain 130. The side expandable curtains 128 may couple to the central expandable curtain directly (e.g., sewn), or indirectly (e.g., via straps, tethers, etc.).

Coupling the side expandable curtains 128 to the central expandable curtain 130 may help deploy the central expandable curtain 130 and/or control the deployment of the central expandable curtain 130. For example, when deployed, the side expandable curtains 128 may help pull the central expandable curtain 130 from the vehicle roof 110 (e.g., in a direction towards the vehicle floor 108) whether or not the central expandable curtain 130 comprises an airbag.

Atop 214 of the central expandable curtain 130 may not be coupled to the top 208 of the side expandable curtains 128. In some instances, the top 214 of the central expandable curtain 130 may be spaced apart (e.g., not coupled, not attached, not connected, etc.) from the top 208. For example, as shown, the top 214 of the central expandable curtain 130 may be spaced apart from the first section 200 and the second section 202 by a distance 216. The distance 216 may be any suitable distance. However, the top 214 of the expandable curtain 130 may be disconnected from the first section 200 and the second section 202. Spacing the first section 200 and the second section 202 apart from the central expandable curtain 130 may reduce the weight and/or volume of material within the vehicle roof 110, allow for doors or other breaks in the seam along a roof of a vehicle, or otherwise.

In some instances, the side expandable curtains 128 and the central expandable curtain 130 may be formed from separate pieces of material. Alternatively, the side expandable curtains 128 and the central expandable curtain 130 may be formed from the same piece of material. For example, although described as separate expandable curtains, the side expandable curtains 128 (e.g., the first side expandable curtain and the second side expandable curtain) and the central expandable curtain 130 may be contiguous and formed from a single piece of material.

Figure 3:
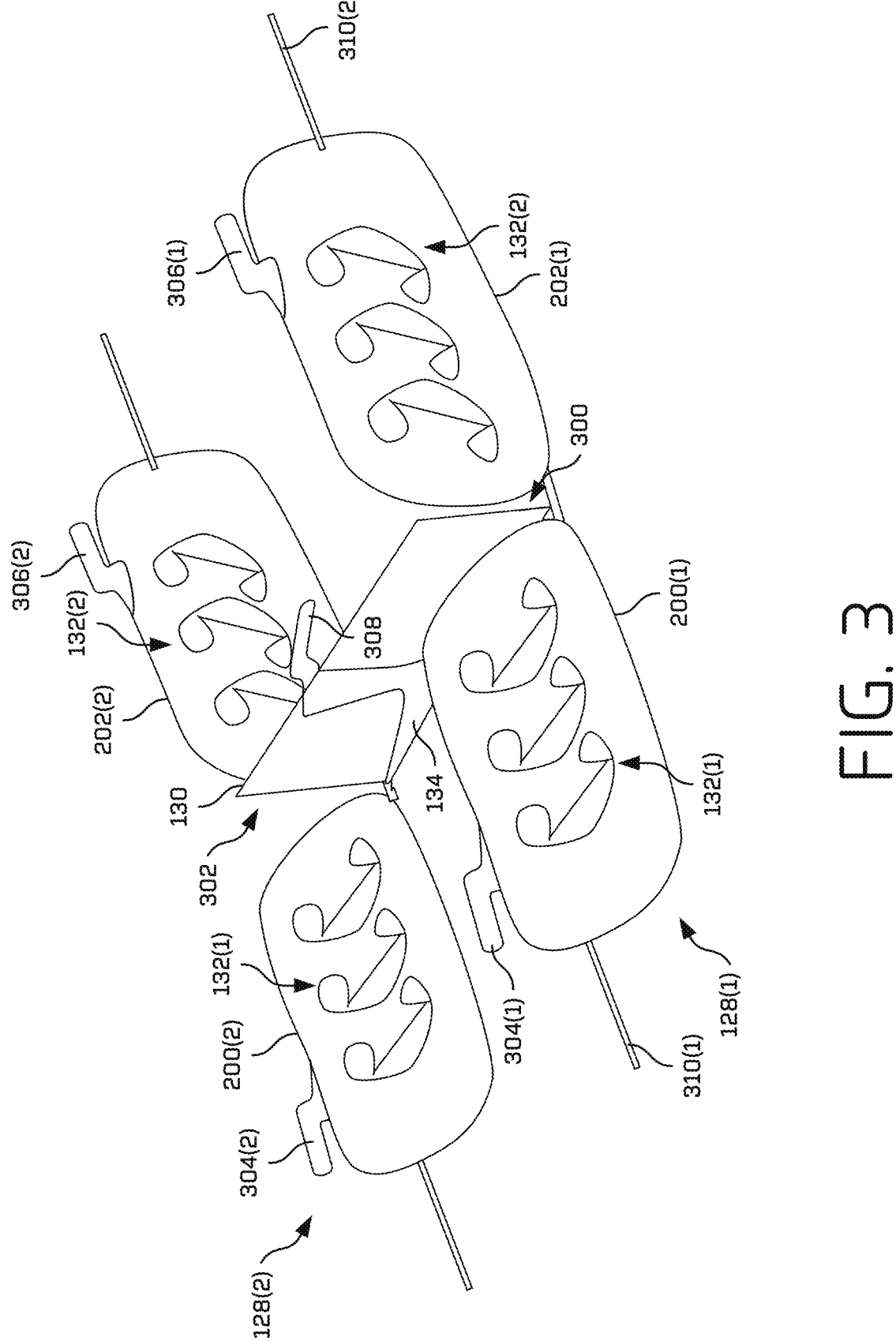
FIG. 3 illustrates an isometric view of an example side expandable curtains and an example central expandable curtain of the occupant protection system of FIG. 1, showing the side expandable curtains and the central expandable curtain in a deployed state, according to an example of the present disclosure.

FIG. 3 illustrates an isometric view of the side expandable curtains 128 and the central expandable curtain 130, according to an embodiment of the present disclosure. The side expandable curtains 128 include a first side expandable curtain 128(1) and a second side expandable curtain 128(2). The first side expandable curtain 128(1) is deployable along a first interior side of the vehicle 100 and the second side expandable curtain 128(2) is deployable along a second interior side of the vehicle 100. The first side expandable curtain 128(1) may include a first section 200(1) and a second section 202(1), and the second side expandable curtain 128(2) may include a first section 200(2) and a second section 202(2). The central expandable curtain 130 is disposed between the first side expandable curtain 128(1) and the second side expandable curtain 128(2).

As introduced above, the first side expandable curtain 128(1) and the second side expandable curtain 128(2) couple to the central expandable curtain 130, along the bottom 210 (e.g., a bottom portion, section, area, etc.). For example, a first side 300 of the central expandable curtain 130 may couple to the first side expandable curtain 128(1), and a second side 302 of the central expandable curtain 130 may couple to the second side expandable curtain 128(2). When deployed, the first side 300 of the central expandable curtain 130 may be disposed between the first section 200(1) and the second section 202(2), and the second side 302 of the central expandable curtain 130 may be disposed between the first section 200(2) and the second section 202(2).

The first section 200(1) includes the first side airbag(s) 132(1) and the second section 202(1) includes the second side airbag(s) 132(2). Likewise, the first section 200(2) includes the first side airbag(s) 132(1) and the second section 202(2) includes the second side airbag(s) 132(2). The central expandable curtain 130 includes the central airbag 134, which represents a portion of the central expandable curtain 130 that is inflated. A remaining portion of the central expandable curtain 130, although not inflated, may prevent or limit projectiles from moving from one end of the vehicle 100 to another.

The side expandable curtains 128 may include a first conduit 304 and a second conduit 306 that route fluid, gas, etc., from the inflators 138 to the first side airbag(s) 132(1) and the second side airbag(s) 132(2), respectively. For example, for the first side expandable curtain 128(1), a first inflator may route fluid into the first side airbag(s) 132(1) via a first conduit 304(1), a second inflator may route fluid into the second side airbag(s) 132(2) via a second conduit 306(1). Likewise, for the second side expandable curtain 128(2), a first inflator may route fluid into the first side airbag(s) 132(1) via a first conduit 304(2), a second inflator may route fluid into the second side airbag(s) 132(2) via a second conduit 306(2). The central expandable curtain 130 may include a conduit 308 that routes fluid into the central airbag 134.

The side expandable curtains 128 may include tethers 310, such as a first tether 310(1) and a second tether 310(2), that anchor the side expandable curtains 128 to the vehicle 100, respectively.

Figure 4:
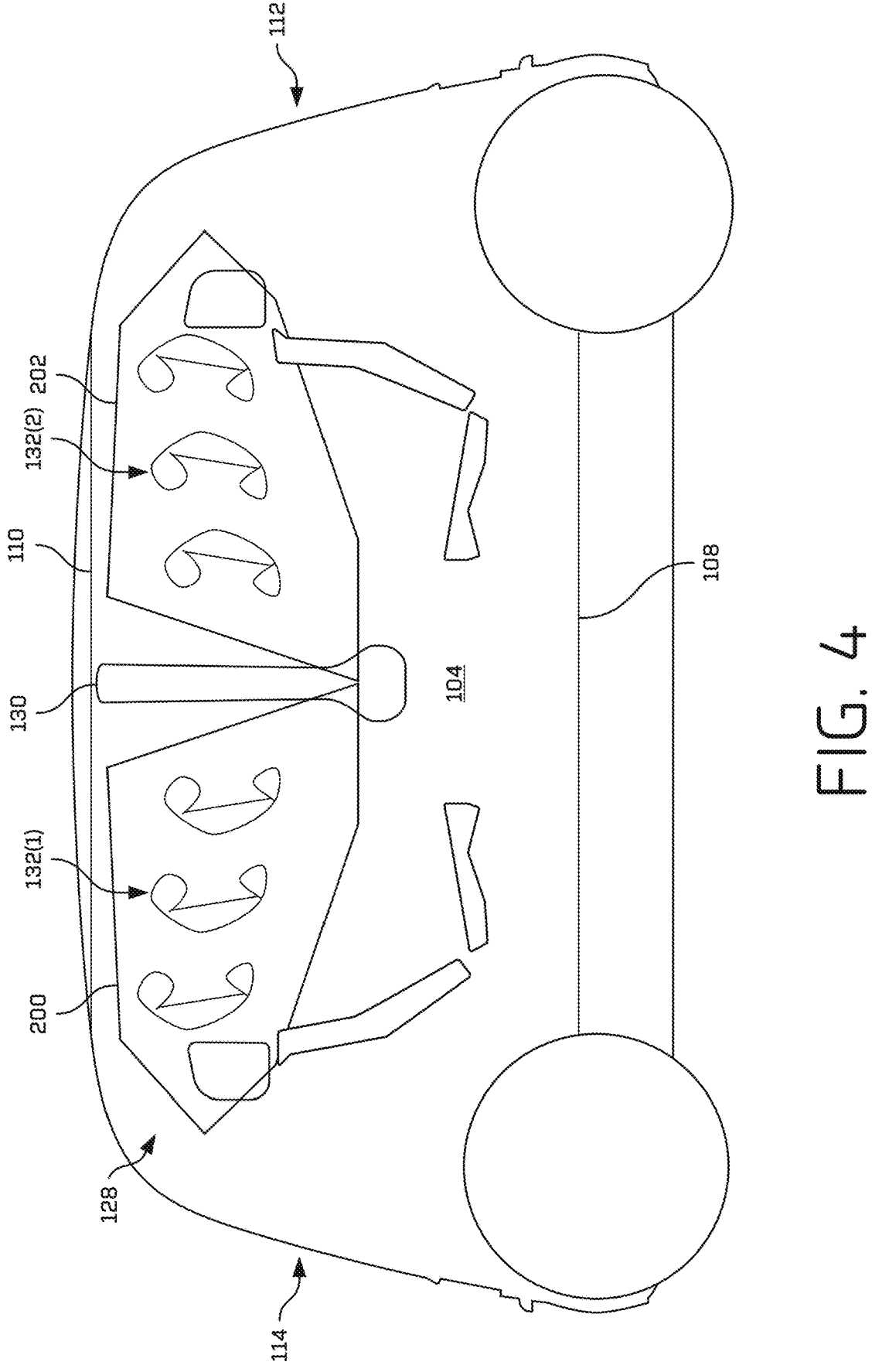
FIG. 4 illustrates a side view of an example side expandable curtain and an example central expandable curtain of the occupant protection system of FIG. 1, showing the side expandable curtain and the central expandable curtain in a deployed state within the vehicle of FIG. 1, according to an example of the present disclosure.

FIG. 4 illustrates the side expandable curtain 128 and central expandable curtain 130 being deployed within the interior 104 of the vehicle 100, according to an embodiment of the present disclosure. As introduced above with regard to FIG. 2, the side expandable curtain 128 and the central expandable curtain 130 are deployed in a direction from the vehicle roof 110 to the vehicle floor 108.

The side expandable curtains 128 may include the first side expandable curtain 128(1) that deploys along a first interior side (e.g., left side) of the vehicle 100 and the second side expandable curtain 128(2) that deploys along a second interior side (e.g., right side) of the vehicle 100. In some instances, the first side expandable curtain 128(1) is configured to extend substantially parallel to the first interior side of the vehicle 100, and/or the second side expandable curtain 128(2) may be configured to extend substantially parallel to the second interior side of the vehicle 100. The first side expandable curtain 128(1) and the second side expandable 128(2) also extend between the first end 112 and the second end 114. The first side expandable curtain 128(1) and the second side expandable curtain 128(2) may also be similar.

The central expandable curtain 130 is disposed between the interior sides of the vehicle 100, such as the first interior side and the second interior side. The central expandable curtain 130 extends transversely between the first side expandable curtain 128(1) and the second side expandable curtain 128(2).

In some instances, the side expandable curtains 128 may prevent ejection of the occupant 106 from within the interior 104 in the event of the collision and/or contact between the occupant 106 (e.g., the head of the occupant) and the interior sides of the vehicle 100. The central expandable curtain 130 may prevent or limit projectiles (e.g., objects, debris, etc.) from moving from one end of the vehicle 100 to another end of the vehicle 100 during the collision (e.g., between the first end 112 and the second end 114).

Figure 5:
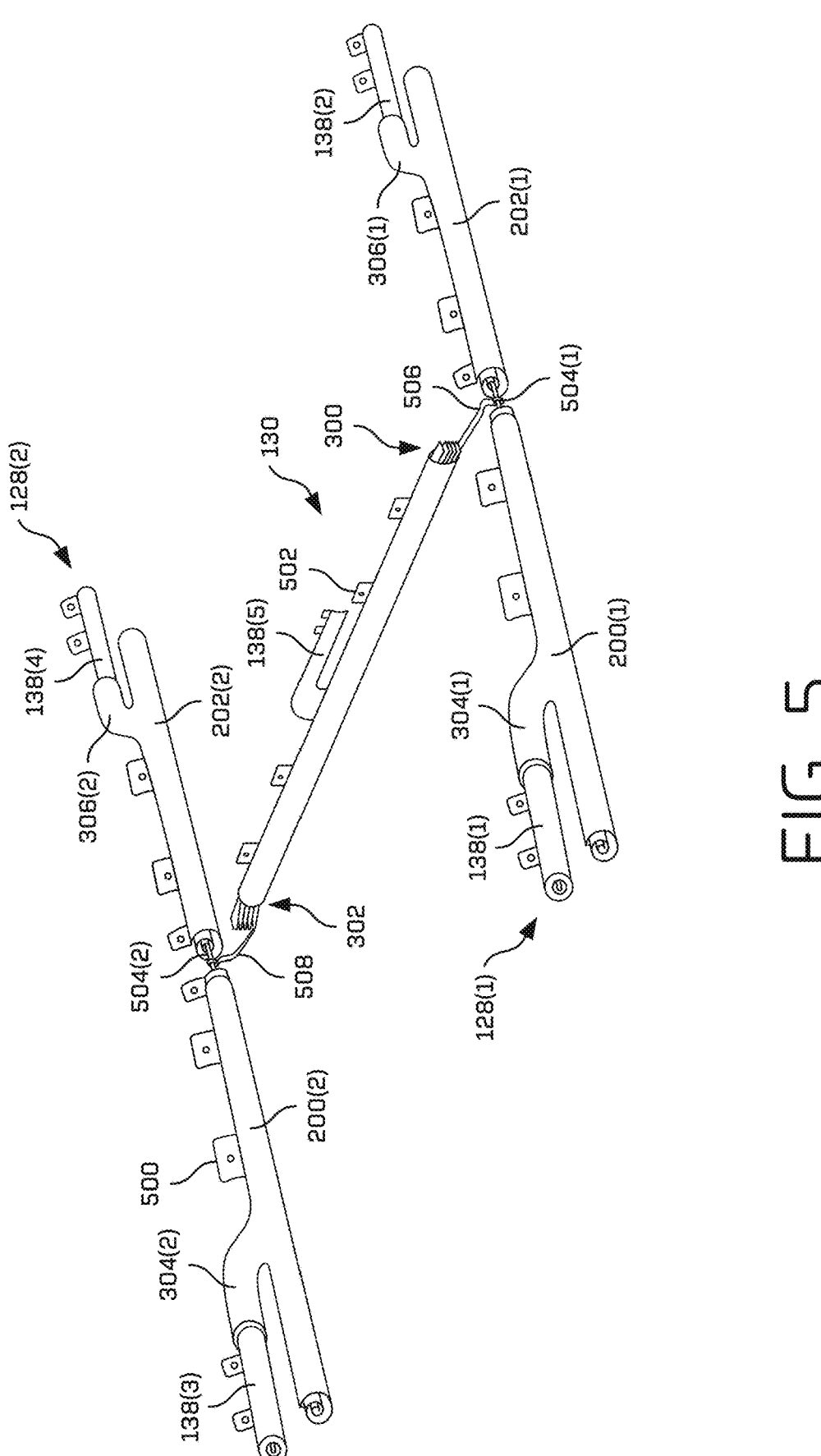
FIG. 5 illustrates an isometric view of example side expandable curtains and an example central expandable curtain of the occupant protection system of FIG. 1, showing the side expandable curtains and the central expandable curtain in a stowed state, according to an example of the present disclosure.

FIG. 5 illustrates a stowed state of the side expandable curtains 128 and the central expandable curtain 130, according to an embodiment of the present disclosure. In the stowed state, the side expandable curtains 128 and the central expandable curtain 130 are disposed in the vehicle roof 110. The side expandable curtains 128 include anchor points 500 formed within the first section 200 and the second section 202. The anchor points 500 may be used to couple the side expandable curtains 128 to the framework 140. The central expandable curtain 130 includes anchor points 502 that may be used to couple the central expandable curtain 130 to the framework 140. Straps, fasteners, clamps, brackets, hooks, etc., may be disposed through the anchor points 500 and/or the anchor points 502 to couple the side expandable curtains 128 and the central expandable curtain 130 to the framework 140.

The inflators 138, such as a first inflator 138(1) and a second inflator 138(2), may also be fluidly connected to the first side airbag(s) 132(1) and the second side airbag(s) 132(1) of the first side expandable curtain 128(1), via the first conduit 304(1) and the second conduit 306(1), respectively. The inflators 138 may also include a third inflator 138(3) and a fourth inflator 138(4) fluidly connected to the first side airbags 132(1) and the second side airbag(s) 132(2) of the second side expandable curtain 128(2). The inflators 138 may also include a fifth inflator 138(5) fluidly connected to the central airbag 134 via the conduit 308.

In some instances, the first section 200 and the second section 202 may be coupled to one another via straps 504. A strap 504(1) may couple the first section 200(1) and the second section 202(1) and a strap 504(2) may couple the first section 200(2) and the second section 202(2). A first strap 506 may couple the central expandable curtain 130 to the first side expandable curtain 128(1) and a second strap 508 may couple the central expandable curtain 130 to the second side expandable curtain 128(2). In some instances, the first strap 506 may couple to the strap 504(1) and the second strap 508 may couple to the strap 504(2). However, instead of using the straps, the first section 200 and the second section 202 may be coupled differently than shown (e.g., sewn together), and/or the central expandable curtain 130 may be coupled to the side expandable curtains 128 differently than shown (e.g., sewn together).

Figure 6:
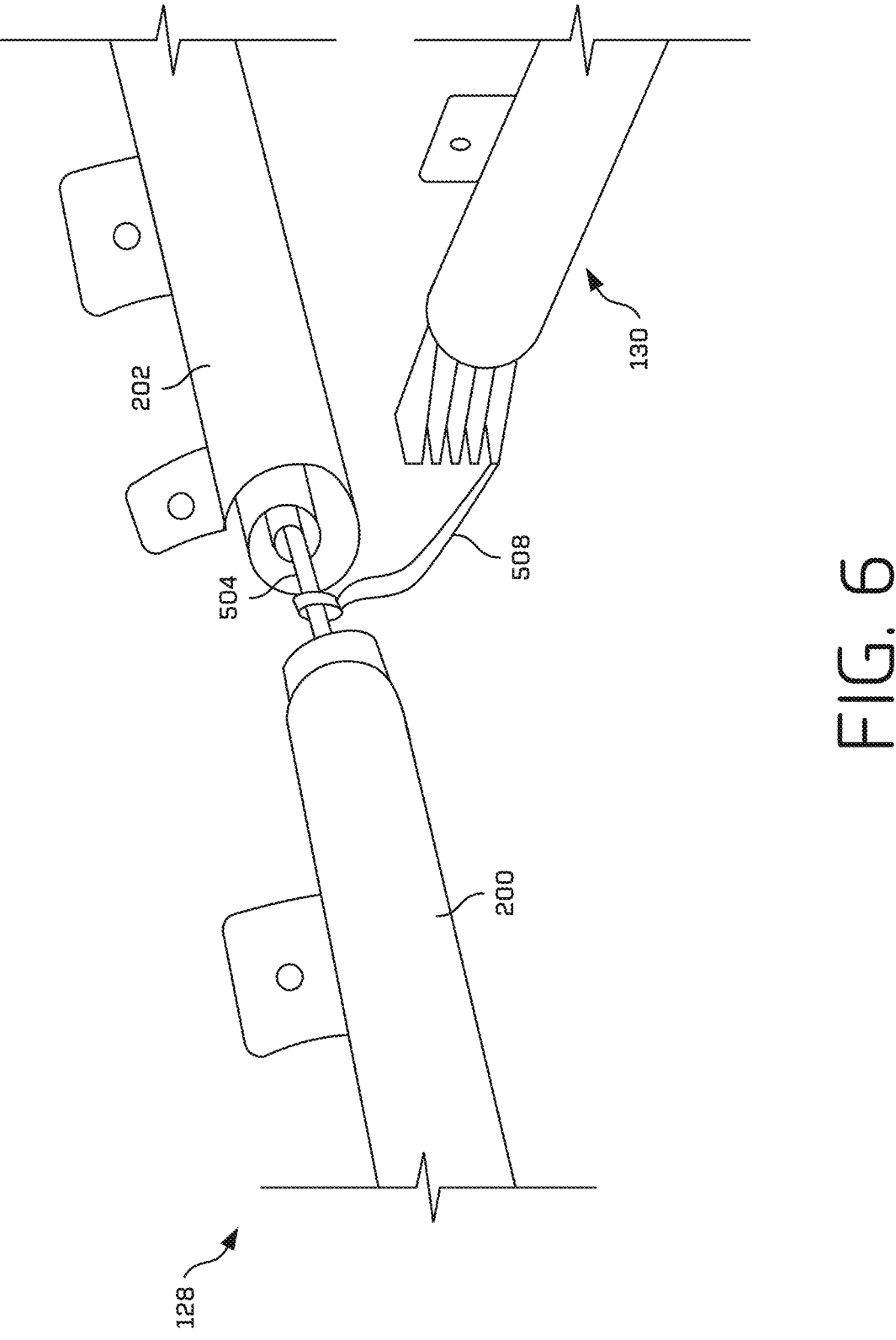
FIG. 6 illustrates an isometric view of an example side expandable curtain and an example central expandable curtain of the occupant protection system of FIG. 1, showing the side expandable curtains and the central expandable curtain in a stowed state, according to an example of the present disclosure.

FIG. 6 illustrates a stowed state of the side expandable curtains 128 and the central expandable curtain 130, according to an embodiment of the present disclosure. In some instances, the side expandable curtains 128 may be stored by rolling the side expandable curtain 128, such that the side expandable curtains 128 are roll-folded into the vehicle roof 110. Rolling of the side expandable curtains 128 may control a deployment of the side expandable curtain 128 along the interior sides of the vehicle 100. The central expandable curtain 130 may span between the side expandable curtains 128 to assist in deploying the side expandable curtains 128 along the interior sides of the vehicle 100.

In some instances, the central expandable curtain 130 may be stored by folding the central expandable curtain 130 in a zigzag fashion. The zigzag folding nature of the central expandable curtain 130 helps with a symmetrical deployment of the central expandable curtain 130 such that the central expandable curtain 130 may be deployed centrally between the interior ends of the vehicle 100. However, although described as being folded in the zigzag fashion, the central expandable curtain 130 may be U-folded or rolled-folded.

The first section 200 and the second section 202 are coupled together via the strap 504. The side expandable curtain 128 may couple to the central expandable curtain 130 via the first strap 506 and the second strap 508.

Figure 7:
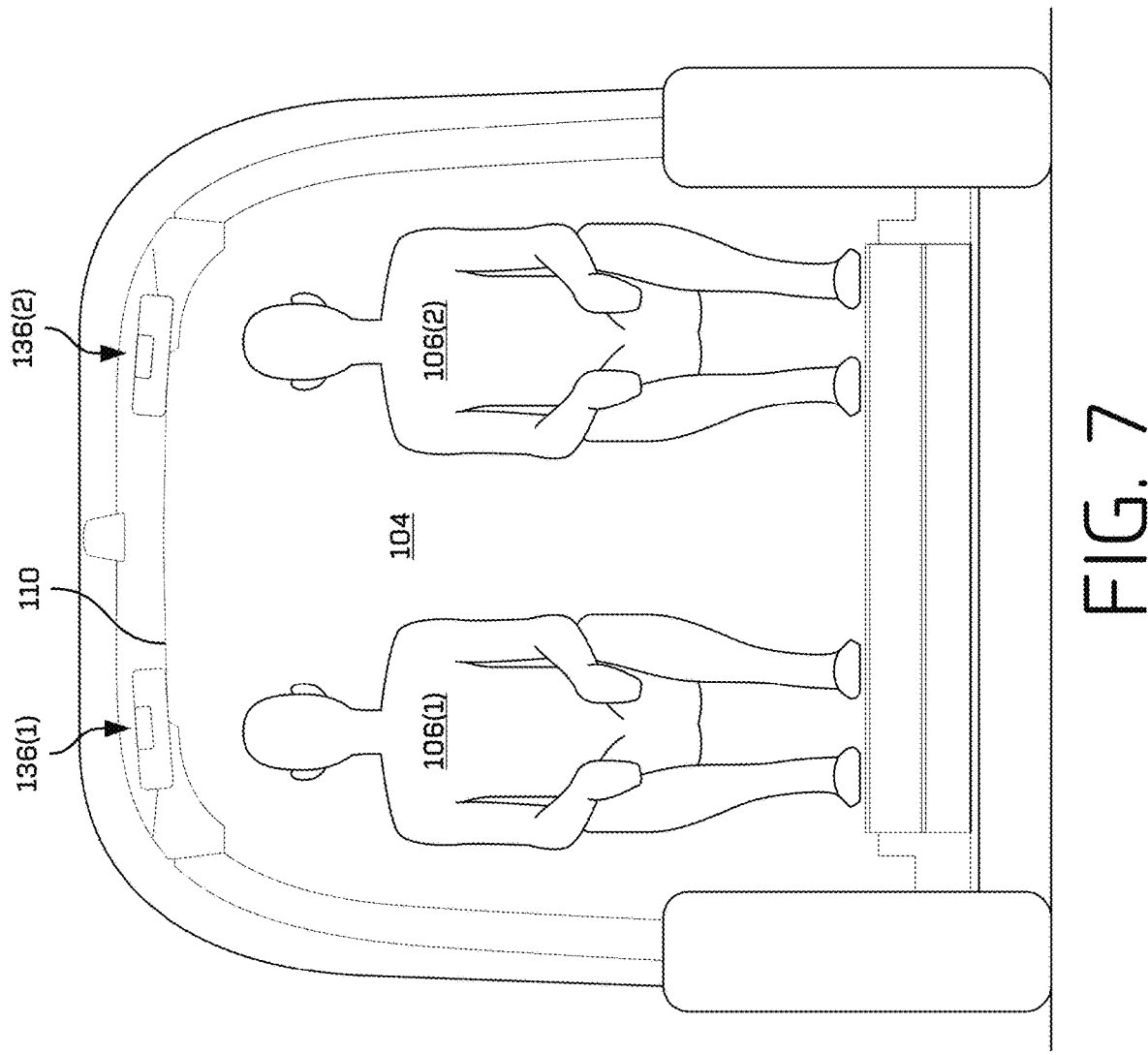
FIG. 7 illustrates a side view of example frontal airbags of the occupant protection system of FIG. 1, showing the frontal airbags in a stowed state, according to an example of the present disclosure.

FIG. 7 illustrates the frontal airbags 136 in a stowed state, according to an embodiment of the present disclosure. FIG. 7 illustrates two of the occupants 106, such as a first occupant 106(1) and a second occupant 106(2), that may be seated with the same bench-style seat. A first frontal airbag 136(1) may be disposed overhead of the first occupant 106(1) and a second frontal airbag 136(2) may be stowed overhead of the second occupant 106(2). The frontal airbags 136 may be stowed in the vehicle roof 110. The frontal airbags 136 may deploy in front of the occupants 106, respectively, during the collision. For example, if the vehicle 100 includes two bench-style seats capable of receiving two of the occupants 106, the vehicle 100 may include four of the frontal airbags 136. The frontal airbags 136, before being deployed, may be located overhead of the occupants 106, within the vehicle roof 110. Locating the frontal airbags 136 in this manner may reduce a weight and/or volume within a central portion of the vehicle roof 110 (e.g., between the interior sides and the interior ends of the vehicle 100). The frontal airbags 136 may be individually deployable. For example, the inflators may be fluidly connected to fill the frontal airbags 136, respectively, in the event of a collision.

Figure 8:
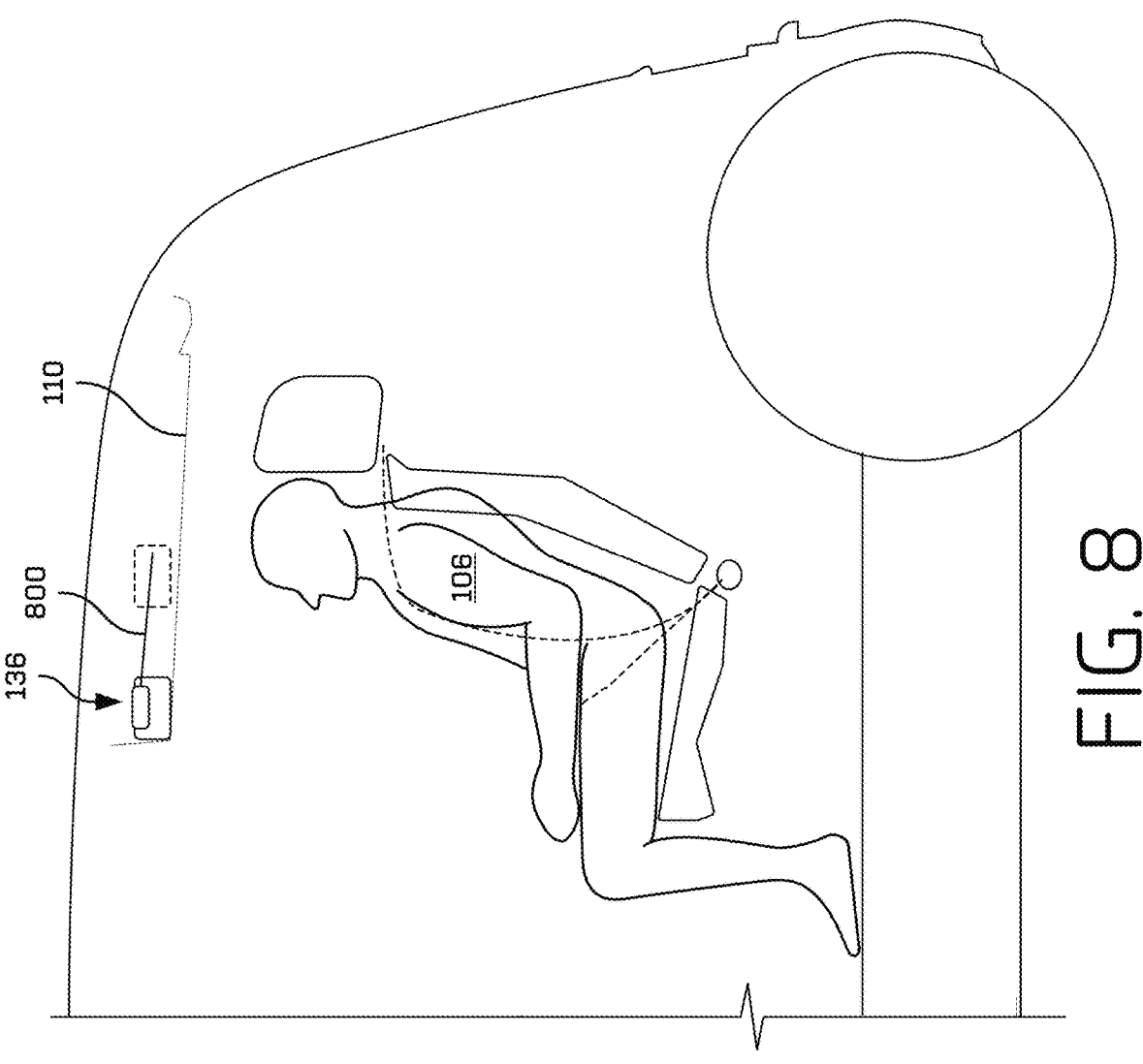
FIG. 8 illustrates a side view of example frontal airbags of the occupant protection system of FIG. 1, showing the frontal airbags in a stowed state, according to an example of the present disclosure.

FIG. 8 illustrates the frontal airbags 136 in a stowed state, according to an embodiment of the present disclosure. In some instances, the frontal airbags 136 may be moveable relative to the occupant 106, or the seats 116, to dispose the frontal airbags 136 above the occupant 106. In doing so, when deployed, the frontal airbag 136 may provide cushion to and restrain movement of the head of the occupant 106. In some instances, the frontal airbags 136 may be engaged along a track 800 (e.g., bar, strut, etc.) to move the frontal airbags 136 in relation to the occupant 106. Actuator(s), for example, may move the frontal airbags 136 along the track 800.

In some instances, the occupant protection system 120 may receive data from sensor(s) of the vehicle 100 that indicate a position of the occupant 106 for use in adjusting the position of the frontal airbag 136 along the track 800. Moreover, the occupant protection system 120 may receive data associated with the occupant 106, such as their height, to adjust the position of the frontal airbag 136. In some instances, the data may be stored within a profile of the occupant 106 that is accessible via the occupant protection system 120.

Figure 9A:
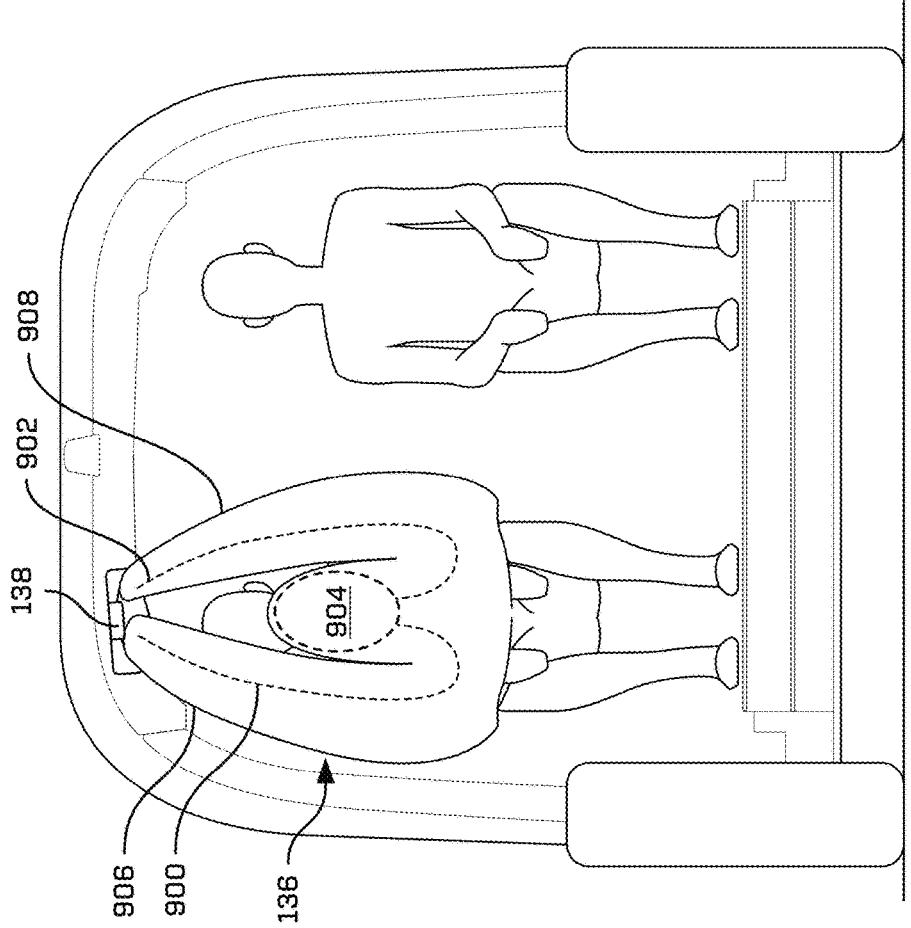
FIG. 9A illustrates a first side view of example frontal airbags of the occupant protection system of FIG. 1, showing the frontal airbags in a deployed state, according to an example of the present disclosure.
Figure 9B:
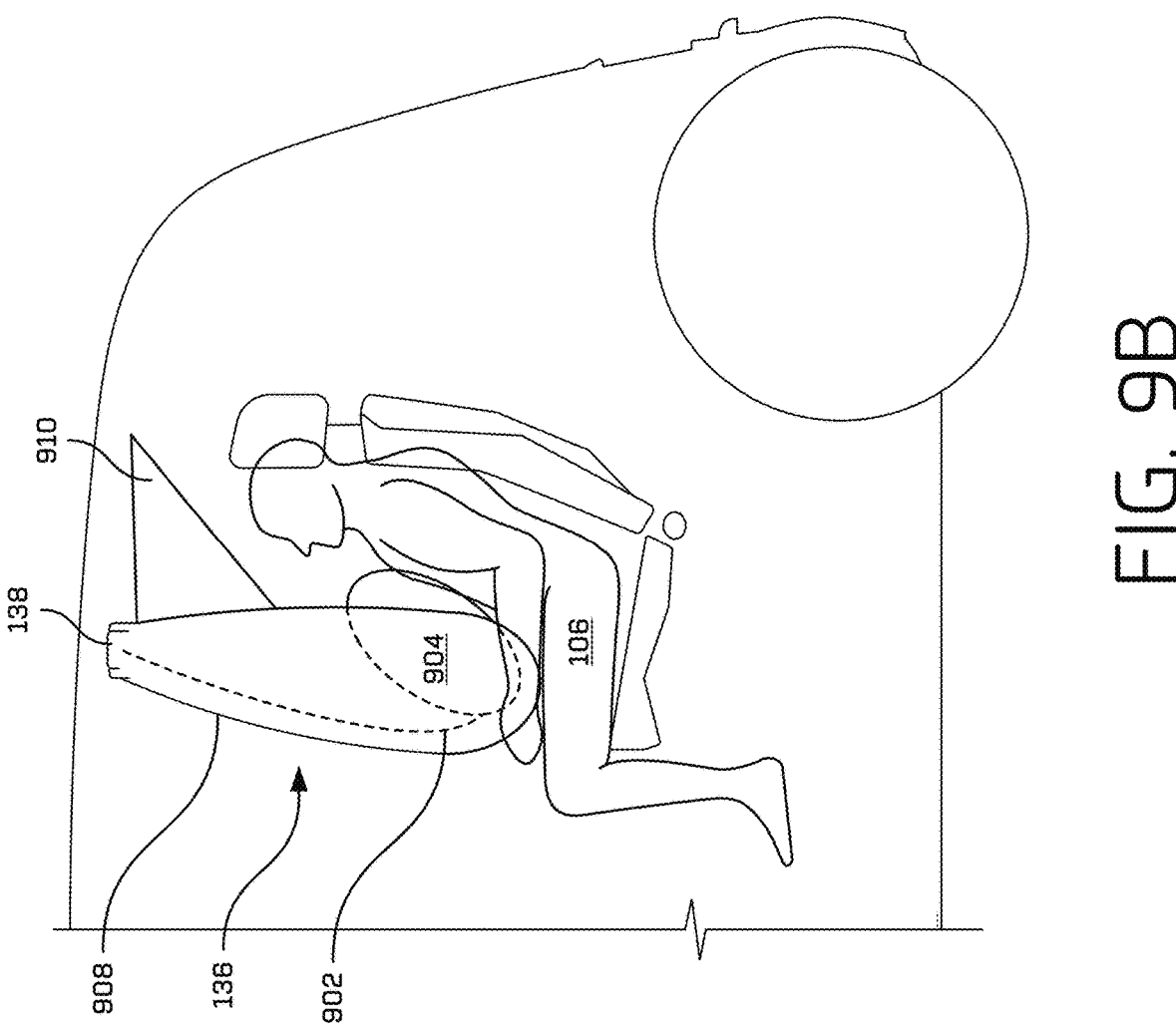
FIG. 9B illustrates a second side view of example frontal airbags of the occupant protection system of FIG. 1, showing the frontal airbags in a deployed state, according to an example of the present disclosure.

FIGS. 9A and 9B illustrate the frontal airbag 136 in a deployed state, according to an embodiment of the present disclosure. In some instances, the frontal airbags 136 may include a first channel 900 and a second channel 902 that are fluidly connected to a central chamber 904. The central chamber 904 may inflate to provide restraint to the head of the occupant 106 in the event of a collision. The first channel 900 and the second channel 902 may route fluid or gas from the inflator(s) 138 to the central chamber 904 to inflate the central chamber 904. In some instances, the first channel 900 and the second channel 902 are formed within sections of the frontal airbag 136. For example, the first channel 900 may be formed within a first section 906 of the frontal airbag 136 and the second channel 902 may be formed within a second section 908 of the frontal airbag 136.

The first channel 900 and the second channel 902 may represent portions of the first section 906 and the second section 908 that route fluid to the central chamber 904 upon inflation. In some instances, the first channel 900 and the second channel 902, being as they route the fluid to the central chamber 904, may be filled or inflated prior to the central chamber 904 being inflated. Portions of the first section 906 and the second section 908 not corresponding to the first channel 900 and the second channel 902, respectively, may provide structure or support to the frontal airbag 136. The first channel 900 and the second channel 902 may be form by stitching or ultrasonic welding a material of the frontal airbags 136.

The first channel 900 and the second channel 902 may route alongside sides of the head of the occupant 106, such as the first channel 900 routing alongside a right side of the head and the second channel 902 routing alongside a left side of the head. The first channel 900 and the second channel 902 may represent ducts, tubes, etc., formed in the frontal airbag 136. As will be explained herein, as the central chamber 904 is inflated, the central chamber 904 may inflate in a direction towards the occupant 106 to restrain movement of the head.

In some instances, the first channel 900 and the second channel 902 may be decoupled at their tops, respectively, but may be coupled to one another at their bottom via the central chamber 904. For example, a top of the first channel 900 (or a portion of the frontal airbag 136 corresponding to the first channel 900) may be decoupled, spaced apart, etc., from a top of the second channel 902 (or a portion of the frontal airbag 136 corresponding to the second channel 902). A bottom of the first channel 900 may be coupled to a bottom of the second channel 902. In doing so, a gap distance is disposed along a length of the first channel 900 and the second channel 902, between the top and the bottom, to accommodate the head of the occupant. In other words, the spacing between the first channel 900 and the second channel 902 may permit the head of the occupant to contact the central chamber 904.

The frontal airbag 136 may also be restrained or anchored to the vehicle roof 110, for example, via straps 910. The straps 910 may assist in deploying the frontal airbag 136 in front of the occupant 106 and/or provide restraint when the head of the occupant 106 makes contact with the frontal airbag 136. The straps 910 may be representative of fabric, tethers, etc.

Figure 10A:
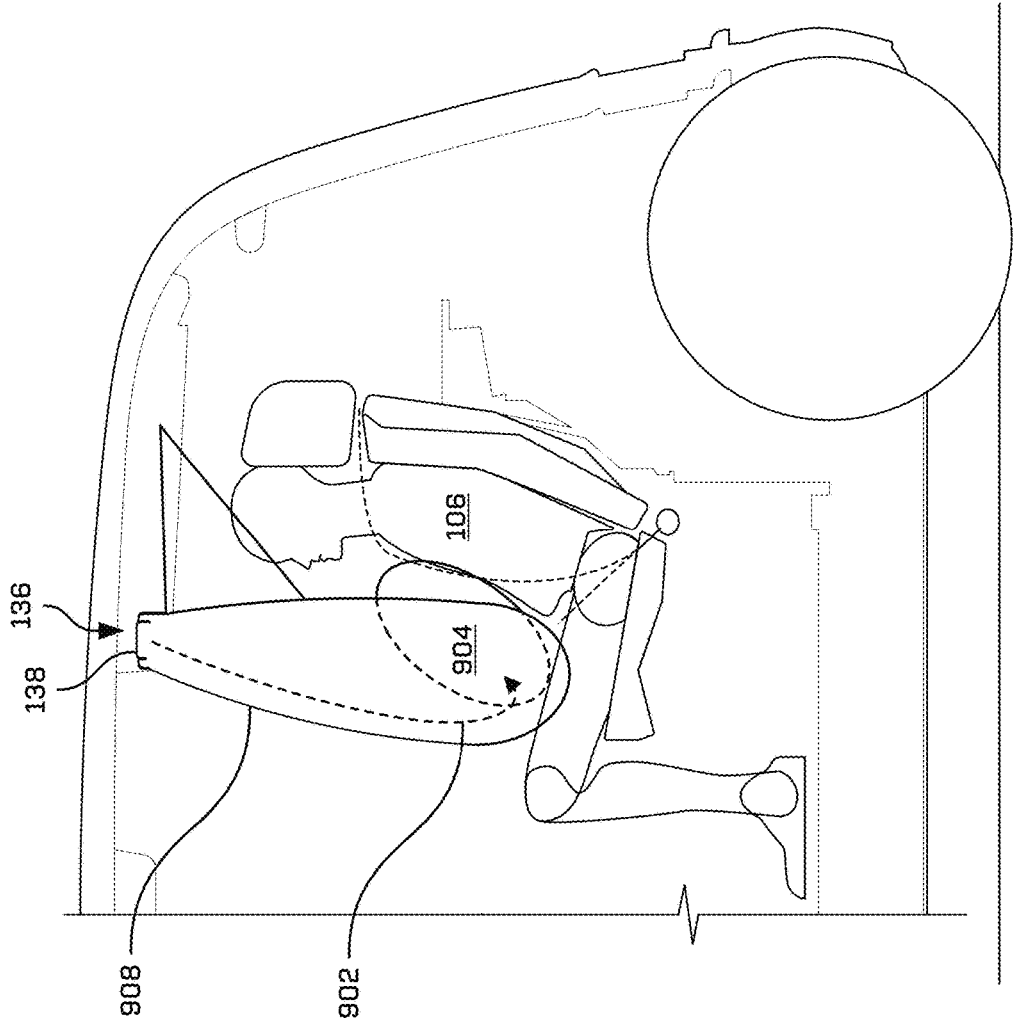
FIGS. 10A-11B illustrate a progression of deploying example frontal airbags, from a stowed state to a deployed state, according to an example of the present disclosure.
Figure 10B:
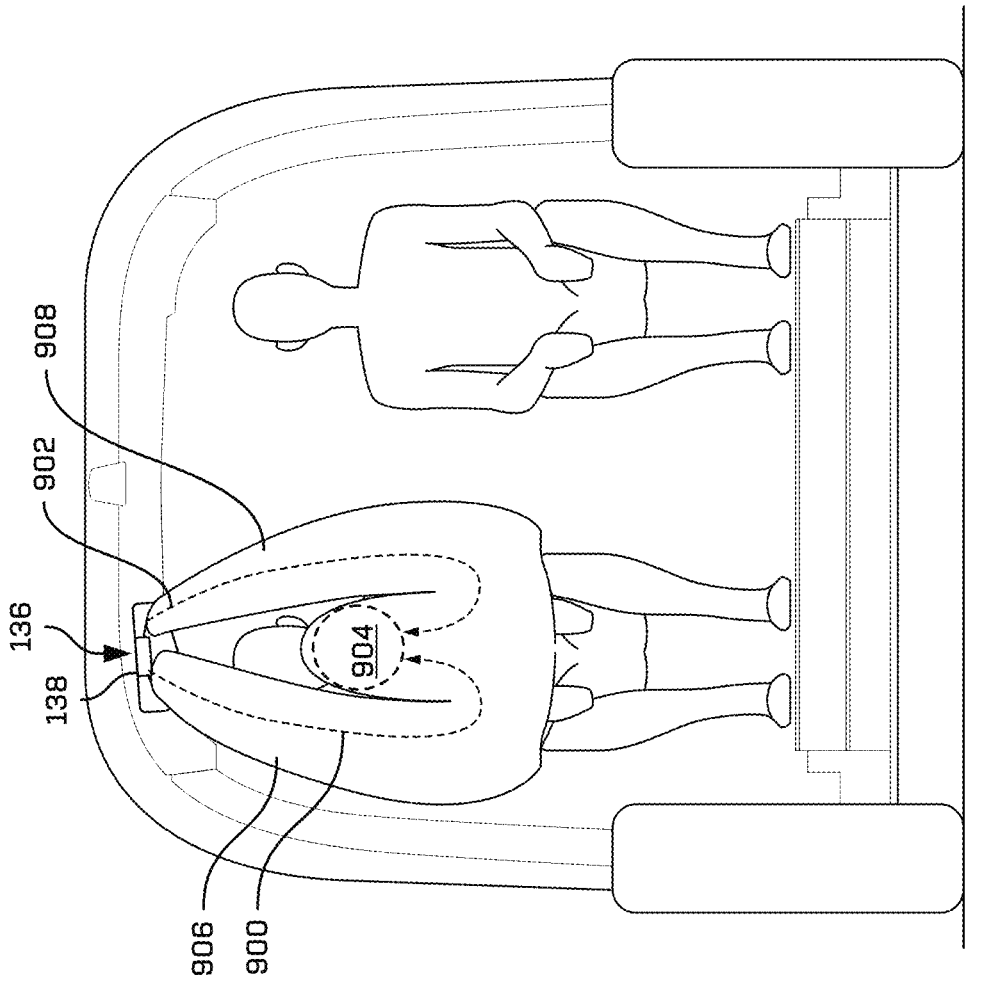
Figure 11A:
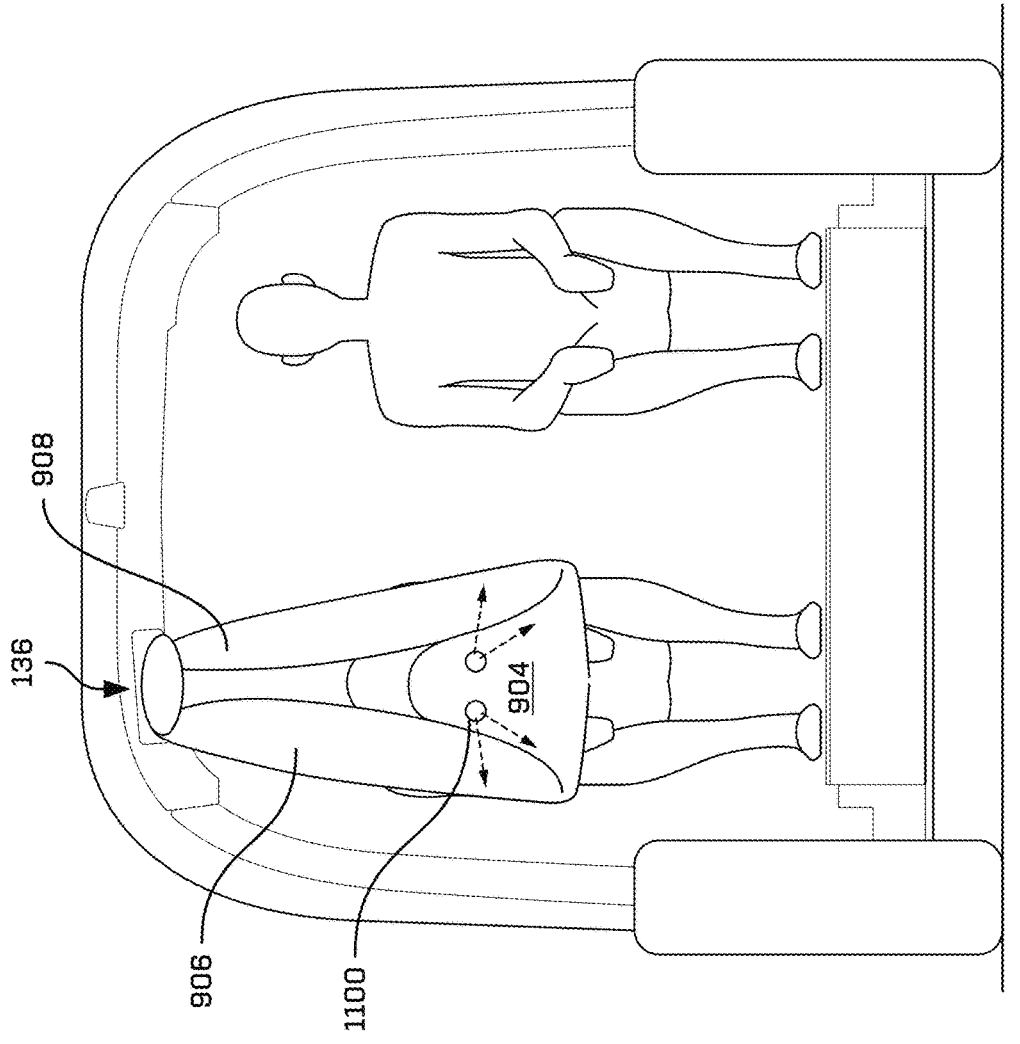
Figure 11B:
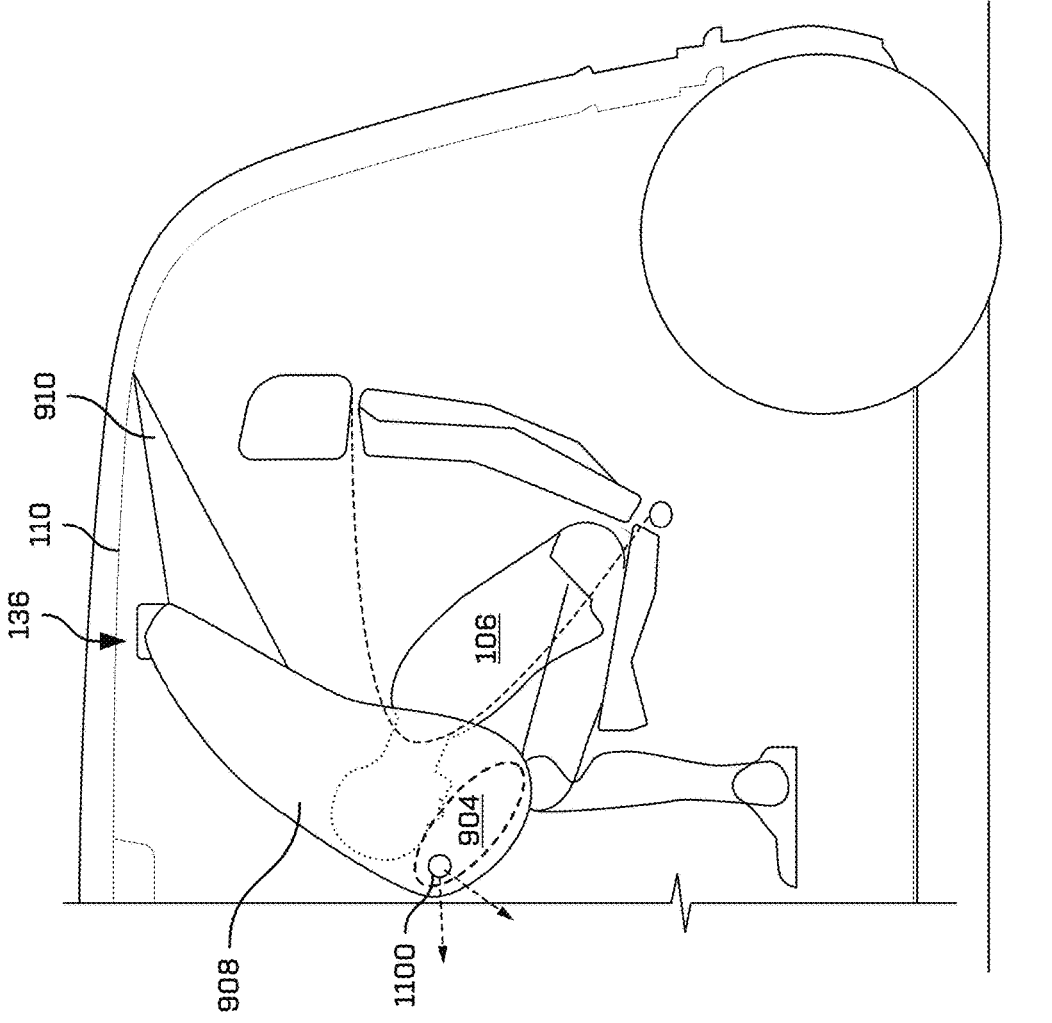

FIGS. 10A-11B illustrate an example sequence to inflate the frontal airbags 136 and restrain the occupant 106 in the event of a collision. More specifically, FIGS. 10A and 10B illustrate a deployment of the frontal airbag 136, and FIGS. 11A and 11B illustrate a restraint of the occupant 106 via the frontal airbag 136.

In FIGS. 10A and 10B, in the event of the collision, the frontal airbags 136 inflate. More specifically, the first channel 900 and the second channel 902 route fluid into the central chamber 904 to inflate the central chamber 904. The central chamber 904 inflates in a direction towards the occupant 106, as shown by a flow of the fluid into the central chamber 904. As such, the frontal airbag 136 inflates in front of the occupant 106. In various examples, the first channel 900 and the second channel 902 may be designed and implemented in such a way that they inflate first (i.e., at least partially inflating before the central/head chamber), causing the full structure of the airbag to deploy and provide earlier safety to any occupants.

In FIGS. 11A and 11B, upon contact with the frontal airbag 136, such as the central chamber 904, fluid within the frontal airbag 136 may vent to decelerate the occupant 106. For example, the central chamber 904 may include vents 1100 through which the fluid within the central chamber 904 vents. The frontal airbag 136, in addition to being coupled to the framework 140 to restrain movement of the frontal airbag 136, may be tethered to the vehicle 100 (e.g., a frame thereof) via the straps 910.

Figure 12:
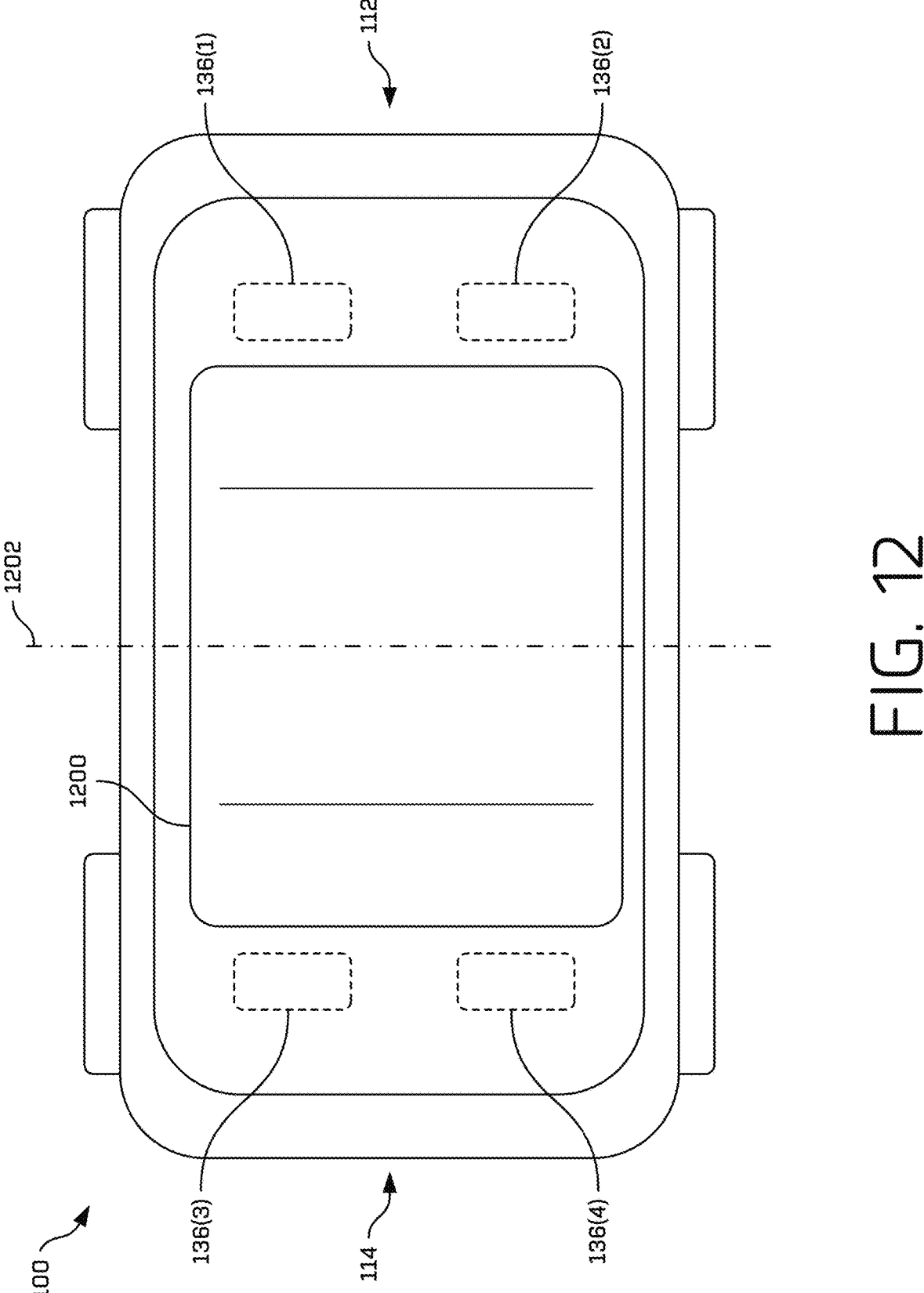
FIG. 12 illustrates a top view of the vehicle, showing a location of the frontal airbags of the occupant protection system of FIG. 1, according to an example of the present disclosure.

FIG. 12 illustrates a top view of the vehicle 100, according to an embodiment of the present disclosure. The vehicle 100 may include a sunroof 1200 that has one or more panels. The frontal airbags 136, which are shown in dashed lines in FIG. 12, may be located external to a perimeter or boundary of the sunroof 1200. In some instances, the frontal airbags 136 may be located closer to ends of the vehicle 100 than a lateral axis 1202 of the vehicle 100. For example, the first frontal airbag 136(1) and the second frontal airbag 136(2) may be located closer to the first end 112 than the lateral axis 1202, and/or the third frontal airbag 136(3) and the fourth frontal airbag 136(4) may be located closer to the second end 114 than the lateral axis 1202.

Figure 13:
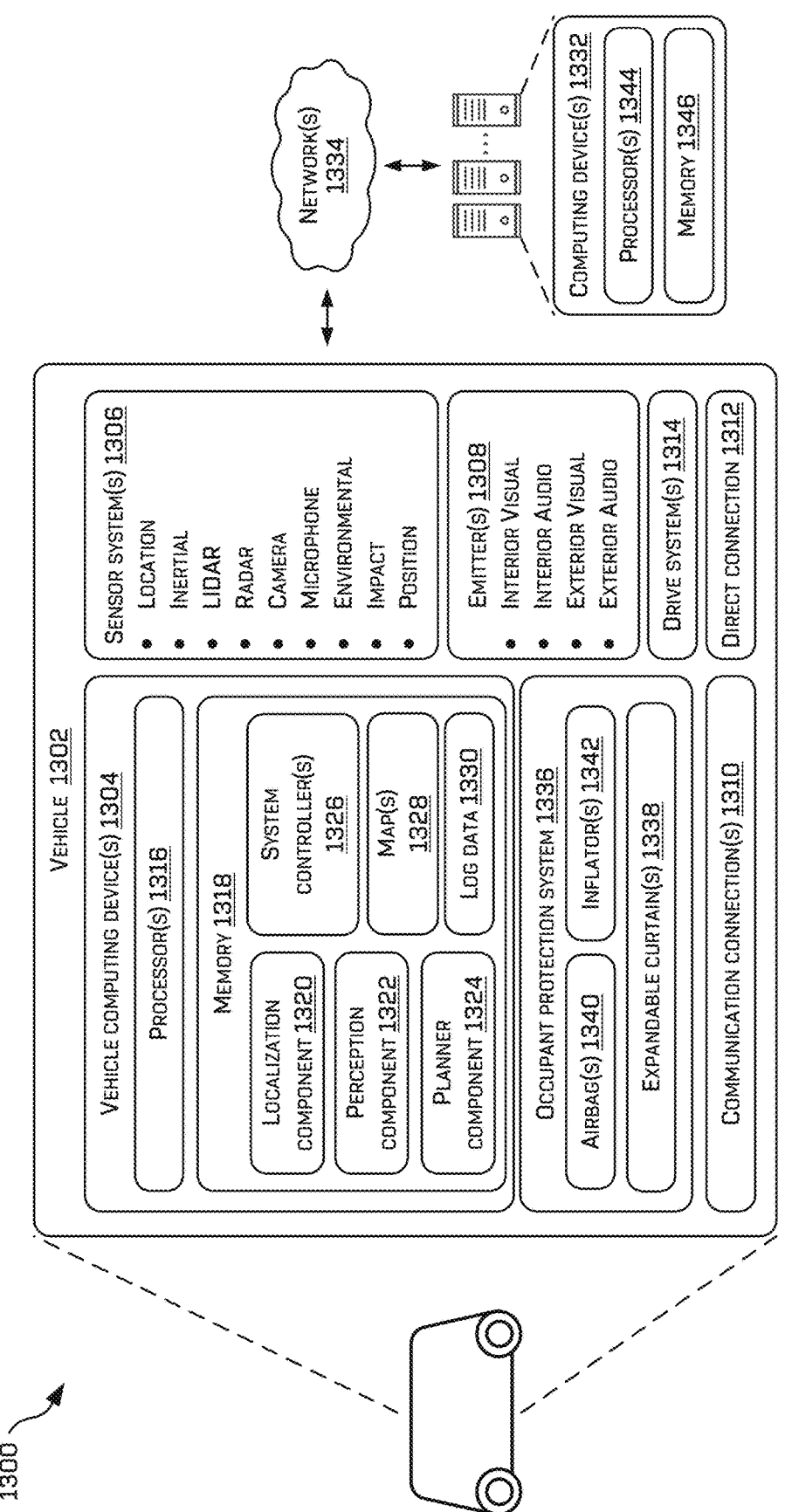
FIG. 13 illustrates a diagram showing an example architecture for vehicle systems including an example occupant protection system, according to an example of the present disclosure.

FIG. 13 is a block diagram of an example system 1300 for implementing the techniques described herein, according to an embodiment of the present disclosure. In at least one example, the system 1300 may include a vehicle, such as a vehicle 1302. The vehicle 1302 may be the same as, or different than, the vehicle 100. The vehicle 1302 may include one or more vehicle computing device(s) 1304, one or more sensor system(s) 1306, one or more emitter(s) 1308, one or more communication connection(s) 1310, at least one direct connection 1312, and drive system(s) 1314.

The vehicle computing device(s) 1304 may include one or more processor(s) 1316 and memory 1318 communicatively coupled with the one or more processor(s) 1316. In the illustrated example, the vehicle 1302 is an autonomous vehicle; however, the vehicle 1302 could be any other type of vehicle, such as a semi-autonomous vehicle, or any other system having at least an image capture device (e.g., a camera enabled smartphone). In the illustrated example, the memory 1318 of the vehicle computing device(s) 1304 stores a localization component 1320, a perception component 1322, a planner component 1324, one or more system controller(s) 1326, map(s) 1328, and log data 1330. Though depicted in FIG. 13 as residing in the memory 1318 for illustrative purposes, it is contemplated that the localization component 1320, the perception component 1322, the planner component 1324, the system controller(s) 1326, and the map(s) 1328 may additionally, or alternatively, be accessible to the vehicle 1302 (e.g., stored on, or otherwise accessible by, memory remote from the vehicle 1302, such as, for example, on memory 1346 of the computing device(s) 1332).

In at least one example, the localization component 1320 may include functionality to receive data from the sensor system(s) 1306 to determine a position and/or orientation of the vehicle 1302 (e.g., one or more of an x-, y-, z-position, roll, pitch, or yaw). For example, the localization component 1320 may include and/or request/receive a map of an environment and may continuously determine a location and/or orientation of the autonomous vehicle within the map. In some instances, the localization component 1320 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 1320 may provide data to various components of the vehicle 1302 to determine an initial position of an autonomous vehicle for generating a path polygon associated with the vehicle path, as discussed herein.

In an embodiment, the perception component 1322 may include functionality to perform object detection, segmentation, and/or classification. In some examples, the perception component 1322 may provide processed sensor data that indicates a presence of an object (e.g., entity) that is proximate to the vehicle 1302 and/or a classification of the object as an object type (e.g., car, pedestrian, cyclist, animal, building, tree, road surface, curb, sidewalk, unknown, etc.). In some examples, the perception component 1322 may provide processed sensor data that indicates a presence of a stationary entity that is proximate to the vehicle 1302 and/or a classification of the stationary entity as a type (e.g., building, tree, road surface, curb, sidewalk, unknown, etc.).

In additional or alternative examples, the perception component 1322 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planner component 1324 may determine a path for the vehicle 1302 to follow to traverse through an environment. For example, the planner component 1324 may determine various routes and trajectories and various levels of detail. For example, the planner component 1324 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 1324 may generate an instruction for guiding the vehicle 1302 along at least a portion of the route from the first location to the second location. In at least one example, the planner component 1324 may determine how to guide the vehicle 1302 from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 1302 to navigate.

The system controller(s) 1326 may be configured to control steering, propulsion, braking, safety, emitters, communication, and other systems of the vehicle 1302. The system controller(s) 1326 may communicate with and/or control corresponding systems of the drive system(s) 1314 and/or other components of the vehicle 1302.

The memory 1318 may further include the map(s) 1328 that may be used by the vehicle 1302 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 1302 may be controlled based at least in part on the map(s) 1328. That is, the map(s) 1328 may be used in connection with the localization component 1320, the perception component 1322, and/or the planner component 1324 to determine a location of the vehicle 1302, detect objects in an environment, and/or generate routes and/or trajectories to navigate within an environment. Additionally, in some examples, the map(s) 1328 may be used in connection with a tracker component to determine a position and/or orientation of the vehicle with respect to a planned trajectory, such as based on steering angles, velocities, accelerations, drive direction, drive gear, and/or gravity acceleration.

In some examples, the map(s) 1328 may be stored on a computing device(s) (such as the computing device(s) 1332) accessible via network(s) 1334. In some examples, one or more of the map(s) 1328 may be stored based on, for example, a characteristic (e.g., type of entity, time of day, day of week, season of the year, etc.). Storing one or more of the map(s) 1328 may have similar memory requirements, but increase the speed at which data in a map may be accessed.

The log data 1330 may represent data input and/or output by each of the localization component 1320, the perception component 1322, the planner component 1324, the system controller(s) 1326, and/or outputs of various subcomponents thereof. In at least one example, the log data 1330 may include sensor data captured and provided to one or more of the components of the vehicle computing device(s) 1304 by the sensor system(s) 1306.

As can be understood, the components discussed herein (e.g., the localization component 1320, the perception component 1322, the planner component 1324, the system controller(s) 1326, and the map(s) 1328) are described as divided for illustrative purposes. However, the operations performed by the various components may be combined or performed in any other component. For example, in the illustrative example, the functions of a tracker component as described above may be performed by the planner component 1324. However, in other examples, the tracker component may include a separate component independent of the planner component 1324.

In an embodiment, aspects of some or all of the components discussed herein may include any models, techniques, and/or machine learning techniques. For example, in some instances, the components in the memory 1318 (and the memory 1346, discussed below) may be implemented as a neural network.

The sensor system(s) 1306 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 1306 may include multiple instances of each of these or other types of sensors. For instance, the lidar sensors may include individual lidar sensors located at the corners, front, back, sides, and/or top of the vehicle 1302. As another example, the camera sensors may include multiple cameras disposed at various locations about the exterior and/or interior of the vehicle 1302. The sensor system(s) 1306 may provide input to the vehicle computing device(s) 1304. Additionally, or alternatively, the sensor system(s) 1306 may send sensor data, via the one or more network(s) 1334, to the one or more computing device(s) 1332 at a particular frequency, after a lapse of a predetermined period of time, in near real-time, etc.

The vehicle 1302 may also include one or more emitter(s) 1308 for emitting light and/or sound, as described above. The emitter(s) 1308 in this example include interior audio and visual emitters to communicate with passengers of the vehicle 1302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 1308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 1302 may also include the communication connection(s) 1310 that enable communication between the vehicle 1302 and one or more other local or remote computing device(s). For instance, the communication connection(s) 1310 may facilitate communication with other local computing device(s) on the vehicle 1302 and/or the drive system(s) 1314. Also, the communication connection(s) 1310 may allow the vehicle 1302 to communicate with other nearby computing device(s) (e.g., the computing device(s) 1332, other nearby vehicles, etc.) and/or one or more remote sensor system(s) for receiving sensor data.

The communication connection(s) 1310 may include physical and/or logical interfaces for connecting the vehicle computing device(s) 1304 to another computing device or a network, such as the network(s) 1334. For example, the communication connection(s) 1310 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 1302 may include the drive system(s) 1314. In some examples, the vehicle 1302 may have one of the drive system(s) 1314. In at least one example, if the vehicle 1302 has more than one of the drive system(s) 1314, individual ones of the drive system(s) 1314 may be positioned on opposite ends of the vehicle 1302 (e.g., the front and the rear, etc.). In at least one example, the drive system(s) 1314 may include one or more sensor systems to detect conditions of the drive system(s) 1314 and/or the surroundings of the vehicle 1302. By way of example and not limitation, the sensor system(s) may include one or more wheel encoders (e.g., rotary encoders) to sense rotation of the wheels of the drive system(s) 1314, inertial sensors (e.g., inertial measurement units, accelerometers, gyroscopes, magnetometers, etc.) to measure orientation and acceleration associated with the drive system(s) 1314, cameras or other image sensors, ultrasonic sensors to acoustically detect objects in the surroundings of the drive system(s) 1314, lidar sensors, radar sensors, etc. Some sensors, such as the wheel encoders may be unique to the drive system(s) 1314. In some cases, the sensor system(s) on the drive system(s) 1314 may overlap or supplement corresponding systems of the vehicle 1302 (e.g., the sensor system(s) 1306).

The drive system(s) 1314 may include many of the vehicle systems, including batteries, a motor to propel the vehicle 1302, an inverter to convert direct current from the batteries into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1314 may include a drive system controller which may receive and preprocess data from the sensor system(s) and to control the operation of the various vehicle systems. In some examples, the drive system controller may include one or more processors and memory communicatively coupled with the one or more processors. The memory 1318 may store one or more modules to perform various functionalities of the drive system(s) 1314. Furthermore, the drive system(s) 1314 may also include one or more communication connection(s) that enable communication by the respective drive system with one or more other local or remote computing device(s).

In at least one example, the at least one direct connection 1312 may provide a physical interface to couple the drive system(s) 1314 with the body of the vehicle 1302. For example, the at least one direct connection 1312 may allow the transfer of energy, fluids, air, data, etc. between the drive system(s) 1314 and the vehicle 1302. In some instances, the at least one direct connection 1312 may further releasably secure the drive system(s) 1314 to the body of the vehicle 1302.

In at least one example, the localization component 1320, the perception component 1322, the planner component 1324, and/or the one or more system controller(s) 1326, and/or various components thereof, may process sensor data, as described above, and may send their respective outputs as the log data 1330, over the one or more network(s) 1334, to the computing device(s) 1332. In at least one example, the vehicle computing device(s) 1304 may send the log data 1330 to the computing device(s) 1332 at a particular frequency, after a lapse of a predetermined period of time, in near real-time, etc.

In some examples, the vehicle 1302 may send sensor data to the computing device(s) 1332 via the network(s) 1334. In some examples, the vehicle 1302 may receive sensor data from the computing device(s) 1332 via the network(s) 1334. The sensor data may include raw sensor data and/or processed sensor data and/or representations of sensor data. In some examples, the sensor data (raw or processed) may be sent and/or received as one or more log files.

The vehicle 1302 may include an occupant protection system 1336, which may be the same as the occupant protection system 120 detailed above. For example, and without limitation, the occupant protection system 1336 may include functionality to determine a collision event, determine the presence of occupant(s) in the vehicle 1302, and/or determine a direction of travel of the vehicle 1302. Based at least in part on any of this information, all of this information, and/or any other information, the occupant protection system 1336 may cause one or more expandable curtain(s) 1338 and/or one or more airbag(s) 1340 to transition from a stowed state to a deployed state. For example, the occupant protection system 1336 may instruct inflator(s) 1342 to inflate the airbag(s) 1340. Inflation of the airbag(s) 1340 may cause the expandable curtain(s) 1338 to transition from the stowed state to the deployed state.

In some instances, the expandable curtain(s) 1338 may include side expandable curtain(s) that deploy along the interior sides of the vehicle 1302, between the interior ends. For example, a first side expandable curtain may deploy along a first interior side of the vehicle 1302, and a second side expandable curtain may deploy along a second interior side of the vehicle 1302. The second interior side may be spaced apart from the first interior side. In addition, the expandable curtain(s) 1338 may include a central expandable curtain that deploys within or between the interior sides. The central expandable curtain may be coupled to the side expandable curtains. The side expandable curtains and the central expandable may include one or more of the airbag(s) 1340.

The airbag(s) 1340 may also include frontal airbags that deploy in front of the occupants. The frontal airbags, when deployed, are disposed between the side expandable curtains, as well as between the central expandable curtain and one of the first interior end or the second interior end of the vehicle 1302. The frontal airbags may restrain the movement of the occupant's head to limit forces or moments experienced by the occupants.

In some instances, the occupant protection system 1336 may receive one or more signals indicative of the presence of an occupant 106 in a first location of the vehicle 1302 associated with (e.g., within an effective range of) one of the expandable curtain(s) 1338 and/or airbag(s) 1340, and cause deployment of corresponding expandable curtain(s) 1338 and/or airbag(s) 1340 associated with the position of the occupant 106 based at least in part on the one or more signals. In some instances, the side expandable curtains and the central expandable curtain may deploy in the event of the collision, however, only frontal airbags located in front of the occupants 106 may be deployed.

In some instances, the occupant protection system 1336 may leverage one or more of the sensor system(s) 1306 and determine information about the occupant 106, such as, for example, the size and/or weight of the occupant 106 (e.g., whether the occupant 106 is an adult, a child, or an infant). If no occupant 106 is present, the occupant protection system 1336 may receive one or more signals associated with whether the occupant 106 is in the seat. This may prevent unnecessary deployment and prevent costs associated with servicing deployed parts of the occupant protection system 1336.

In some instances, deployment of the expandable curtain(s) 1338 and/or one or more of the airbag(s) 1340 may be affected by a number of parameters. For example, the deployment rate, the deployment volume (or pressure), the timing of deployment, and/or the sequence of deployment of one or more of the expandable curtain(s) 1338 or the airbag(s) 1340 may be altered based at least in part on one or more parameters, such as, for example, the severity of a collision impact, whether one or more of the occupants 106 is/are properly wearing a seatbelt, and/or the size and/or weight of the occupant(s) 106 (e.g., depending on whether the occupant 106 is an adult, a child, or an infant).

As introduced above, the vehicle 1302 may be communicatively coupled to the computing device(s) 1332. The computing device(s) 1332 may be configured to perform, or control, any or all of the operations of the vehicle 1302, such deployment of the occupant protection system 1336.

The processor(s) 1316 and/or processor(s) 1344 of the computing device(s) 1332 may be any suitable processor capable of executing instructions to process data and perform operations as described herein. By way of example and not limitation, the processor(s) 1316 and/or 1344 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 1318 and/or 1346 are examples of non-transitory computer-readable media. The memory 1318 and/or 1346 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 1318 and/or 1346 can be implemented as a neural network.

As described herein, an exemplary neural network is an algorithm that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet52, ResNet101, VGG, DenseNet, PointNet, and the like.

Figure 14:
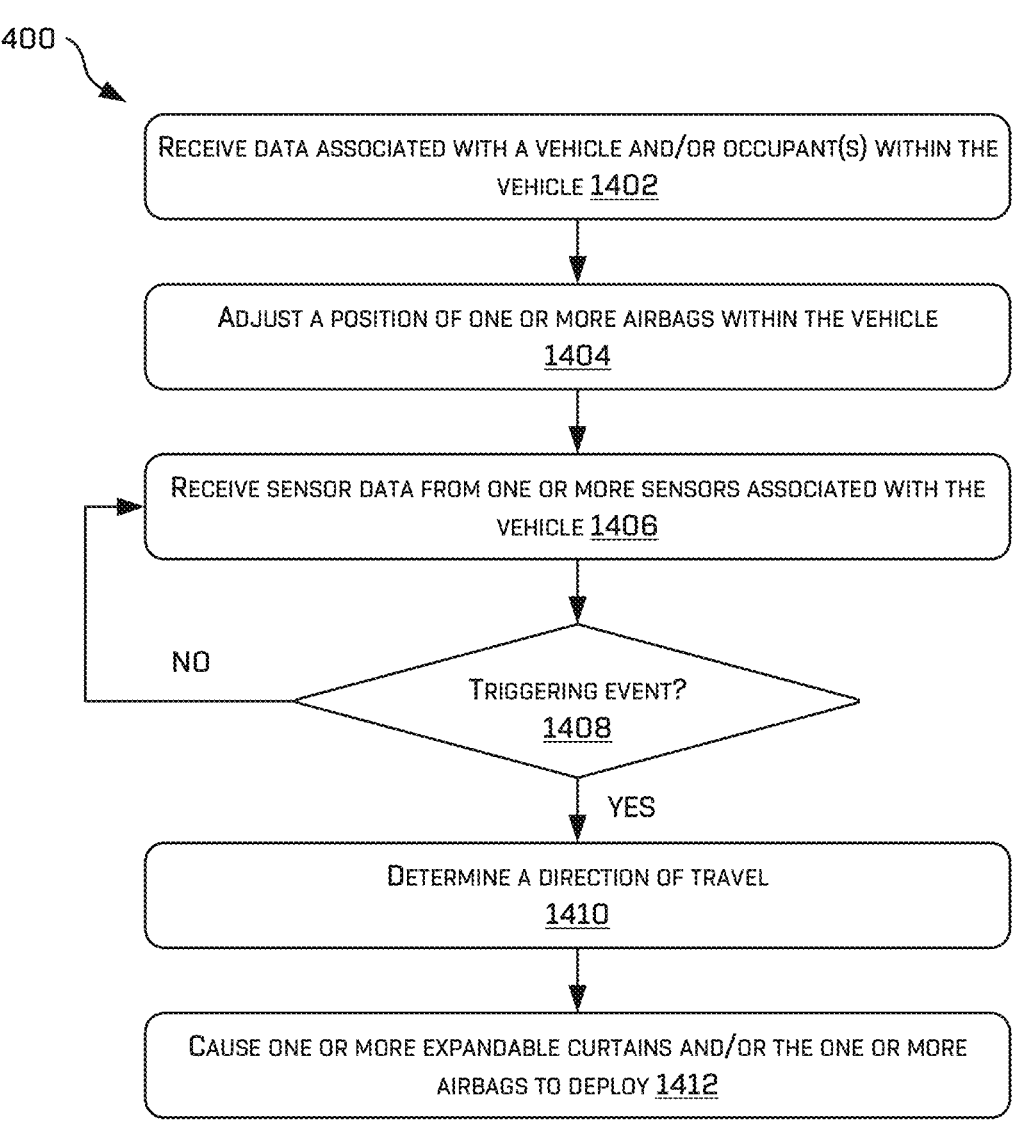
FIG. 14 illustrates an example process for deploying an occupant protection system, according to an example of the present disclosure.

FIG. 14 illustrates an example process 1400 in accordance with examples of the disclosure. The process 1400 is illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes. For example, some or all of the process 1400 may be performed by one or more components in FIGS. 1-13, as described herein.

At 1402, the process 1400 may include receiving data associated with a vehicle and/or occupant(s) within a vehicle. In some instances, the data is generated via sensor(s) of the vehicle, for example, that indicate a presence of the occupant(s) of the vehicle, where the occupant(s) are seated, and/or information associated with occupant(s), such as their height, weight, etc. In some instances, the data may be accessed or otherwise determined from a profile associated with the occupant, where the profile indicates a height, weight, etc., of the occupant. In some instances, the profile of the occupant may be accessed through knowing an identifier of the occupant (e.g., name, phone number, etc.), based on the occupant scheduling the vehicle, etc.

At 1404, the process 1400 may include adjusting a position of one or more airbags within the vehicle. In some instances, the position of the airbags may be adjusted based at least in part on the data. For example, the position of the airbags may be adjusted to dispose the airbags (e.g., the frontal airbags) overhead of the occupants. In some instances, the airbags may be adjusted for only those seats in which an occupant is seated. Adjustment of the position of the airbags may permit the airbags to be deployed in front of the occupant to more effectively restrain the occupant in the event of a collision.

At 1406, the process 1400 may include receiving sensor data from one or more sensors associated with the vehicle. For example, the sensors may generate sensor data associated with a vehicle. The sensor(s) may include the sensor system(s) the occupant sensors as discussed above. Without limitation, the sensors from which the sensor data is received at 1406 may include location sensors, position sensors, proximity sensors, inertial sensors, LIDAR sensors, camera sensors, microphone sensors, environmental sensors, impact sensors, and/or other sensor modalities.

At 1408, the process 1400 may include determining whether a triggering event exists. Whether the triggering event (e.g., collision, rapid deceleration, etc.) exists may be based at least in part on the sensor data received at 1406. For example, the sensor data may indicate or be used to determine whether the vehicle has been involved in a collision, or that a collision is imminent. As stated above, vehicle may utilize sensor data such a LIDAR information to determine the surroundings of the environment around the vehicle. Such surroundings may contain obstacles, objects, people, other vehicles, among other things. The systems may receive the sensor information and make a determination, with prediction algorithms, such as machine learning models, and determine that there will be a collision of an imminent collision involving the vehicle. Additionally, or alternatively, IMU signals, or other impact sensors may be used to determine a collision has occurred.

If at 1408, the process 1400 determines that the there is a triggering event, the process 1400 may follow the "YES" route and proceed to 1410. Otherwise, the process 1400 may loop to 1406, following the "NO" route from 1408.

At 1410, the process 1400 may include determining a direction of travel of the vehicle. For example, as stated above, the vehicle may move in a bidirectional manner. As such, any seat, depending on the direction of travel, may be forward-facing or rear-facing. For example, the operation 1410 may be carried out by the direction detection component discussed above.

At 1412, the process 1400 may include deploying one or more expandable curtains and/or the one or more airbags to deploy. In some instances, the operation 1412 may include causing the expandable curtains, such as the side expandable curtains and/or the central expandable curtain, to be deployed. Deploying the expandable curtains may include causing the expandable curtains to expand from a stowed state to a deployed state extending substantially across an interior of the vehicle between a first interior side and a second interior side. Moreover, the airbags of the side expandable curtains and/or the central expandable curtain may be inflated, and/or the frontal airbags may be deployed. In an embodiment, only those frontal airbags corresponding to seats in which the occupants are seated may be deployed.

CLAUSES

The following paragraphs describe various examples. Any of the examples in this section may be used with any other of the examples in this section and/or any of the other examples or embodiments described herein.

A: A vehicle comprising: a first seat; a second seat; and an occupant protection system including: a first side expandable curtain configured to expand from a stowed state to a deployed state, the first side expandable curtain including: a first section configured to extend along a first portion of a first interior side of the vehicle, the first section having a first side airbag expandable proximate the first interior side and the first seat, and a second section configured to extend along a second portion of the first interior side of the vehicle, the second section having a second side airbag expandable proximate the first interior side and the second seat; a second side expandable curtain configured to expand from a stowed state to a deployed state, the second side expandable curtain including: a third section configured to extend along a first portion of a second interior side of the vehicle, the third section having a third side airbag expandable proximate the second interior side and the first seat, and a fourth section configured to extend along a second portion of the second interior side of the vehicle, the fourth section having a fourth side airbag expandable proximate the second interior side and the second seat; a central expandable curtain configured to expand from a stowed state to a deployed state, the central expandable curtain having an airbag expandable at least partially between the first interior side and the second interior side, the central expandable curtain including: a top portion that is not coupled to the first side expandable curtain and the second side expandable curtain, and a bottom portion coupled to the first side expandable curtain and the second side expandable curtain; a first frontal airbag configured to expand from a stowed state to a deployed state, the first frontal airbag configured to deploy adjacent to the first seat, the first frontal airbag including: a first channel, a second channel, and a first central chamber fluidly connected to the first channel and the second channel, wherein the first central chamber is inflated after the first channel and the second channel are at least partially inflated; and a second frontal airbag configured to expand from a stowed state to a deployed state, the second frontal airbag configured to deploy adjacent to the second seat, the second frontal airbag including: a third channel, a fourth channel, and a second central chamber fluidly connected to the third channel and the fourth channel, wherein the second central chamber is inflated after the third channel and the fourth channel are at least partially inflated.

B: The vehicle of paragraph A, wherein: the first side expandable curtain includes a top and a bottom; the second side expandable curtain includes a top and a bottom the top of the central expandable curtain is not attached to the first side expandable curtain at a location between the first section and the second section; the top of the central expandable curtain is not attached to the second side expandable curtain at a location between the third section and the fourth section; the bottom of the central expandable curtain couples to the bottom of the first side expandable curtain; and the bottom of the central expandable curtain couples to the bottom of the second side expandable curtain.

C: The vehicle of paragraph A or B, further comprising: a first inflator configured to inflate the first side airbag; a second inflator configured to inflate the second side airbag; a third inflator configured to inflate the third side airbag; a fourth inflator configured to inflate the fourth side airbag; a fifth inflator configured to inflate the airbag of the central expandable curtain; a sixth inflator configured to inflate the first frontal airbag; and a seventh inflator configured to inflate the second frontal airbag.

D: The vehicle of any of paragraphs A-C, wherein: in the stowed state, the first frontal airbag is located overhead of the first seat; and in the stowed state, the second frontal airbag is located overhead of the second seat.

E: The vehicle of any of paragraphs A-D, wherein: the first side expandable curtain is roll folded in the stowed state; the second side expandable curtain is roll folded in the stowed state; and the central expandable curtain is zig-zag folded in the stowed state.

F: A system comprising: a first expandable curtain configured to expand from a stowed state to a deployed state, the first expandable curtain including one or more first airbags that inflate; a second expandable curtain configured to expand from a stowed state to a deployed state, the second expandable curtain including one or more second airbags that inflate; a third expandable curtain configured to expand from a stowed state to a deployed state, the third expandable curtain including: a top portion which is not connected to either the first expandable curtain and the second expandable curtain, and a bottom portion coupled to the first expandable curtain and the second expandable curtain such that the third expandable curtain expands from the stowed state to the deployed state during (i) expansion of the first expandable curtain from the stowed state to the deployed state and (ii) expansion of the second expandable curtain from the stowed state to the deployed state; and a third airbag configured to expand from a stowed state to a deployed state.

G: The system of paragraph F, wherein the third expandable curtain is disposable between the first expandable curtain and the second expandable curtain.

H: The system of paragraph F or G, wherein the third expandable curtain includes an airbag that inflates.

I: The system of any of paragraphs F-H, wherein: the first expandable curtain includes a first section and a second section; the first section includes a first airbag of the one or more first airbags; the second section includes a second airbag of the one or more first airbags; the second expandable curtain includes a third section and a fourth section; the third section includes a first airbag of the one or more second airbags; and the fourth section includes a second airbag of the one or more second airbags.

J: The system of any of paragraphs F-I, wherein: the third expandable curtain includes a first side and a second side; at the first side, the top portion of the third expandable curtain is disposed between the first section and the second section; and at the second side, the top portion of the third expandable curtain is disposed between the third section and the fourth section.

K: The system of any of paragraphs F-J, wherein: in the deployed state of the third expandable curtain, the top portion of the third expandable curtain is spaced apart from a top of the first expandable curtain and a top of the second expandable curtain; and the bottom portion of the third expandable curtain is coupled proximate to a bottom of the first expandable curtain and a bottom of the second expandable curtain.

L: The system of any of paragraphs F-K, wherein: the first expandable curtain is roll folded in the stowed state; the second expandable curtain is roll folded in the stowed state; and the third expandable curtain is zigzag folded in the stowed state.

M: The system of any of paragraphs F-L, wherein the third airbag includes: a first channel; a second channel; and a central chamber fluidly connected to the first channel and the second channel.

N: The system of any of the paragraphs F-M, wherein the first channel and the second channel are inflated at least partially prior to inflating the central chamber.

O: A system comprising: a first expandable curtain disposed in a roof of a vehicle, the first expandable curtain being configured to selectively deploy from a stowed configuration to a deployed configuration; a second expandable curtain disposed in the roof of the vehicle, the second expandable curtain being configured to selectively deploy from a stowed configuration to a deployed configuration; a third expandable curtain disposed in the roof of the vehicle, the third expandable curtain being configured to selectively deploy from a stowed configuration to a deployed configuration; a first airbag disposed in the roof of the vehicle, the first airbag being configured to selectively deploy from a stowed configuration to a deployed configuration, the first airbag including: a first channel, a second channel, and a first central chamber fluidly connected to the first channel and the second channel, wherein the first central chamber is inflated after the first channel and the second channel are at least partially inflated; and a second airbag disposed in the roof of the vehicle, the second airbag being configured to selectively deploy from a stowed configuration to a deployed configuration.

P: The system of paragraph O, wherein: the first expandable curtain includes a first top and a first bottom; the second expandable curtain includes a second top and a second bottom; the third expandable curtain includes a third top and a third bottom; the third top is not attached to either the first top and the second top; and the third bottom is coupled to the first bottom and the second bottom.

Q: The system of paragraph O or P, wherein at least one of: the first expandable curtain includes one or more third airbags; the second expandable curtain includes one or more fourth airbags; or the third expandable curtain includes one or more fifth airbags.

R: The system of any of paragraphs O-Q, wherein: the first expandable curtain includes a first section and a second section; the first section includes a third airbag; the second section includes a fourth airbag; the second expandable curtain includes a third section and a fourth section; the third section includes a fifth airbag; and the fourth section includes a sixth airbag.

S: The system of any of paragraphs O-R, wherein: in the deployed configuration of the third expandable curtain, a first top of the third expandable curtain is spaced apart from a second top of the first expandable curtain and a third top of the second expandable curtain; and a first bottom of the third expandable curtain couples proximate to a second bottom of the first expandable curtain and a third bottom of the second expandable curtain.

T: The system of any of paragraphs O-S, wherein: the first expandable curtain is roll folded in the stowed configuration; the second expandable curtain is roll folded in the stowed configuration; and the third expandable curtain is zigzag folded in the stowed configuration.

While the example clauses described above are described with respect to one particular implementation, it should be understood that, in the context of this document, the content of the example clauses may also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
a first seat;
a second seat; and
an occupant protection system including:
a first side expandable curtain configured to expand from a stowed state to a deployed state, the first side expandable curtain including:
a first section configured to extend along a first portion of a first interior side of the vehicle, the first section having a first side airbag expandable proximate the first interior side and the first seat, and
a second section configured to extend along a second portion of the first interior side of the vehicle, the second section having a second side airbag expandable proximate the first interior side and the second seat;
a second side expandable curtain configured to expand from a stowed state to a deployed state, the second side expandable curtain including:
a third section configured to extend along a first portion of a second interior side of the vehicle, the third section having a third side airbag expandable proximate the second interior side and the first seat, and
a fourth section configured to extend along a second portion of the second interior side of the vehicle, the fourth section having a fourth side airbag expandable proximate the second interior side and the second seat;
a central expandable curtain configured to expand from a stowed state to a deployed state, the central expandable curtain having an airbag expandable at least partially between the first interior side and the second interior side, the central expandable curtain including:
a top portion that is not coupled to the first side expandable curtain and the second side expandable curtain, and
a bottom portion coupled to the first side expandable curtain and the second side expandable curtain;
a first frontal airbag configured to expand from a stowed state to a deployed state, the first frontal airbag configured to deploy adjacent to the first seat, the first frontal airbag including:
a first channel,
a second channel, and
a first central chamber fluidly connected to the first channel and the second channel, wherein the first central chamber is inflated after the first channel and the second channel are at least partially inflated; and a second frontal airbag configured to expand from a stowed state to a deployed state, the second frontal airbag configured to deploy adjacent to the second seat, the second frontal airbag including:

a third channel, a fourth channel, and a second central chamber fluidly connected to the third channel and the fourth channel, wherein the second central chamber is inflated after the third channel and the fourth channel are at least partially inflated.

2. The vehicle of claim 1, wherein:

the first side expandable curtain includes a top and a bottom;

the second side expandable curtain includes a top and a bottom;

the top of the central expandable curtain is not attached to the first side expandable curtain at a location between the first section and the second section;

the top of the central expandable curtain is not attached to the second side expandable curtain at a location between the third section and the fourth section;

the bottom of the central expandable curtain couples to the bottom of the first side expandable curtain; and the bottom of the central expandable curtain couples to the bottom of the second side expandable curtain.

3. The vehicle of claim 1, further comprising:

a first inflator configured to inflate the first side airbag;

a second inflator configured to inflate the second side airbag;

a third inflator configured to inflate the third side airbag;

a fourth inflator configured to inflate the fourth side airbag;

a fifth inflator configured to inflate the airbag of the central expandable curtain;

a sixth inflator configured to inflate the first frontal airbag; and a seventh inflator configured to inflate the second frontal airbag.

4. The vehicle of claim 1, wherein:

in the stowed state, the first frontal airbag is located overhead of the first seat; and in the stowed state, the second frontal airbag is located overhead of the second seat.

5. The vehicle of claim 1, wherein:

the first side expandable curtain is roll folded in the stowed state;

the second side expandable curtain is roll folded in the stowed state; and the central expandable curtain is zig-zag folded in the stowed state.

6. A system comprising:

a first expandable curtain configured to expand from a stowed state to a deployed state, the first expandable curtain including one or more first airbags that inflate;

a second expandable curtain configured to expand from a stowed state to a deployed state, the second expandable curtain including one or more second airbags that inflate;

a third expandable curtain configured to expand from a stowed state to a deployed state, the third expandable curtain including:

a top portion which is not connected to either the first expandable curtain and the second expandable curtain, and a bottom portion coupled to the first expandable curtain and the second expandable curtain such that the third expandable curtain expands from the stowed state to the deployed state during (i) expansion of the first expandable curtain from the stowed state to the deployed state and (ii) expansion of the second expandable curtain from the stowed state to the deployed state; and a third airbag configured to expand from a stowed state to a deployed state.

7. The system of claim 6, wherein the third expandable curtain is disposable between the first expandable curtain and the second expandable curtain.

8. The system of claim 6, wherein the third expandable curtain includes an airbag that inflates.

9. The system of claim 6, wherein:

the first expandable curtain includes a first section and a second section;

the first section includes a first airbag of the one or more first airbags;

the second section includes a second airbag of the one or more first airbags;

the second expandable curtain includes a third section and a fourth section;

the third section includes a first airbag of the one or more second airbags; and the fourth section includes a second airbag of the one or more second airbags.

10. The system of claim 9, wherein:

the third expandable curtain includes a first side and a second side;

at the first side, the top portion of the third expandable curtain is disposed between the first section and the second section; and at the second side, the top portion of the third expandable curtain is disposed between the third section and the fourth section.

11. The system of claim 6, wherein:

in the deployed state of the third expandable curtain, the top portion of the third expandable curtain is spaced apart from a top of the first expandable curtain and a top of the second expandable curtain; and the bottom portion of the third expandable curtain is coupled proximate to a bottom of the first expandable curtain and a bottom of the second expandable curtain.

12. The system of claim 6, wherein:

the first expandable curtain is roll folded in the stowed state;

the second expandable curtain is roll folded in the stowed state; and the third expandable curtain is zigzag folded in the stowed state.

13. The system of claim 6, wherein the third airbag includes:

a first channel;

a second channel; and a central chamber fluidly connected to the first channel and the second channel.

14. The system of claim 13, wherein the first channel and the second channel are inflated at least partially prior to inflating the central chamber.

15. A system comprising:

a first expandable curtain disposed in a roof of a vehicle, the first expandable curtain being configured to selectively deploy from a stowed configuration to a deployed configuration;

a second expandable curtain disposed in the roof of the vehicle, the second expandable curtain being configured to selectively deploy from a stowed configuration to a deployed configuration;

a third expandable curtain disposed in the roof of the vehicle, the third expandable curtain being configured to selectively deploy from a stowed configuration to a deployed configuration;

a first airbag disposed in the roof of the vehicle, the first airbag being configured to selectively deploy from a stowed configuration to a deployed configuration, the first airbag including:

a first channel, a second channel, and a first central chamber fluidly connected to the first channel and the second channel, wherein the first central chamber is inflated after the first channel and the second channel are at least partially inflated; and a second airbag disposed in the roof of the vehicle, the second airbag being configured to selectively deploy from a stowed configuration to a deployed configuration.

16. The system of claim 15, wherein:

the first expandable curtain includes a first top and a first bottom;

the second expandable curtain includes a second top and a second bottom;

the third expandable curtain includes a third top and a third bottom;

the third top is not attached to either the first top and the second top; and the third bottom is coupled to the first bottom and the second bottom.

17. The system of claim 15, wherein at least one of:

the first expandable curtain includes one or more third airbags;

the second expandable curtain includes one or more fourth airbags; or the third expandable curtain includes one or more fifth airbags.

18. The system of claim 15, wherein:

the first expandable curtain includes a first section and a second section;

the first section includes a third airbag;

the second section includes a fourth airbag;

the second expandable curtain includes a third section and a fourth section;

the third section includes a fifth airbag; and the fourth section includes a sixth airbag.

19. The system of claim 15, wherein:

in the deployed configuration of the third expandable curtain, a first top of the third expandable curtain is spaced apart from a second top of the first expandable curtain and a third top of the second expandable curtain; and a first bottom of the third expandable curtain couples proximate to a second bottom of the first expandable curtain and a third bottom of the second expandable curtain.

20. The system of claim 15, wherein:

the first expandable curtain is roll folded in the stowed configuration;

the second expandable curtain is roll folded in the stowed configuration; and the third expandable curtain is zigzag folded in the stowed configuration.

\* \* \* \* \*